US011477538B2

(12) United States Patent
Manchester et al.

(10) Patent No.: US 11,477,538 B2
(45) Date of Patent: Oct. 18, 2022

(54) METHODS AND APPARATUS THAT SUPPORT DELIVERY OF TARGETED ADVERTISING CONTENT VIA A SECONDARY CHANNEL

(71) Applicant: TIME WARNER CABLE ENTERPRISES LLC, St. Louis, MO (US)

(72) Inventors: James Manchester, New York, NY (US); Chris Faw, Harrisburg, NC (US); Sean Coar, New York, NY (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 14/098,511

(22) Filed: Dec. 5, 2013

(65) Prior Publication Data

US 2015/0163559 A1  Jun. 11, 2015

(51) Int. Cl.
| | | |
|---|---|---|
| *H04N 21/458* | (2011.01) | |
| *H04N 21/6408* | (2011.01) | |
| *H04N 21/81* | (2011.01) | |
| *H04N 21/643* | (2011.01) | |
| *H04N 21/658* | (2011.01) | |
| *H04N 21/462* | (2011.01) | |
| *H04N 21/442* | (2011.01) | |

(52) U.S. Cl.
CPC ..... *H04N 21/812* (2013.01); *H04N 21/44222* (2013.01); *H04N 21/458* (2013.01); *H04N 21/4622* (2013.01); *H04N 21/6408* (2013.01); *H04N 21/64322* (2013.01); *H04N 21/6582* (2013.01)

(58) Field of Classification Search
CPC ............ H04N 21/812; H04N 21/2668; H04N 21/44008; H04N 21/44213; H04N 21/4532; H04N 21/64322; H04N 21/23424
USPC .......................................................... 725/34
See application file for complete search history.

(56) References Cited

U.S. PATENT DOCUMENTS

| | | | | |
|---|---|---|---|---|
| 8,681,680 | B2* | 3/2014 | Mao ................... | H04N 7/17318 |
| | | | | 370/312 |
| 8,973,057 | B2* | 3/2015 | Cedervall ..................... | 455/436 |
| 2002/0144263 | A1* | 10/2002 | Eldering et al. ................ | 725/34 |

(Continued)

FOREIGN PATENT DOCUMENTS

WO  WO 2010001410 A2 *  1/2010

*Primary Examiner* — Alfonso Castro
(74) *Attorney, Agent, or Firm* — Straub & Straub; Michael P. Straub; Stephen T. Straub

(57) ABSTRACT

Methods and apparatus relating to the supply of targeted advertisements to user devices receiving broadcast or multicast content are described. The methods and apparatus are well suited for systems where content is broadcast or multicast to a plurality of user playback devices, e.g., set top boxes, with advertisements included in the content delivered via a first communications channel, e.g., a broadcast communications channel. Viewing information, e.g., information indicating the tuning of a customer premise device to a channel and/or the outputting of program content is reported to a headend or other device. One or more targeted advertisements are delivered to a customer premise device via a secondary channel, e.g., unicast IP packet channel, with the alternative advertisement being displayed in place of the broadcast advertisement.

14 Claims, 9 Drawing Sheets

(56) References Cited

U.S. PATENT DOCUMENTS

| | | | |
|---|---|---|---|
| 2007/0219859 A1* | 9/2007 | Huntington | 705/14 |
| 2009/0210900 A1* | 8/2009 | Kaftan | H04N 21/234318 725/34 |
| 2010/0131969 A1* | 5/2010 | Tidwell | H04H 60/31 725/14 |
| 2011/0107379 A1* | 5/2011 | Lajoie | H04L 65/1016 725/87 |
| 2011/0110515 A1* | 5/2011 | Tidwell | H04N 21/23109 380/200 |
| 2011/0138064 A1* | 6/2011 | Rieger | G06F 17/30905 709/228 |
| 2011/0280158 A1* | 11/2011 | Shigeeda | H04L 29/12028 370/255 |
| 2012/0117584 A1* | 5/2012 | Gordon | H04N 21/254 725/19 |
| 2015/0070585 A1* | 3/2015 | Sharif-Ahmadi | G08C 17/02 348/564 |

* cited by examiner

METHODS AND APPARATUS THAT SUPPORT DELIVERY OF TARGETED ADVERTISING CONTENT VIA A SECONDARY CHANNEL

FIELD OF THE INVENTION

The present invention relates to content delivery and playback methods and apparatus and, more particularly, to methods and apparatus that support delivery of targeted advertising content communicated via a secondary communications channel that is different from a communications channel used for delivery of programming content.

BACKGROUND OF THE INVENTION

Advertising is an important source of revenue for cable companies, satellite companies and/or other content distributers. Advertisers are often willing to pay a premium if they are able to target their advertisements to a particular audience likely to be interested in their product and/or which is considered a desirable audience to target for a particular reason, e.g., because of their income level, age, location, sex or other attributes/characteristics.

In addition to providing content distributers a chance to sell targeted advertising, content distributers, e.g., cable service providers, internet service providers, etc., can find targeted advertising useful in up selling their own offerings by presenting advertisements for products which are upgrades to services and/or plans which a service subscriber has while avoiding presenting advertisements for services to which a subscriber already subscribes.

Delivery of advertisement content to users watching broadcast or multicast programming content is common. In various systems the advertisements are delivered in the same broadcast signal or transport stream that carries the programming content, e.g., advertising content is interjected with the actual programming content within a broadcast or multicast stream. It is assumed that a users receiving the broadcast or multicast content will view the advertisements transmitted with the content. However, in the case of conventional over the air broadcasts and other broadcast transmission whether they be over a cable network or another communications channel, there is often no way to know whether a particular broadcast and the advertising content communicated as part of the broadcast is being output and viewed by a user of a set top box or other playback device.

Advertisers and broadcasters of programming content are always looking out for ways to improve targeting of advertisements based on various factors so that advertising content that is relevant or is of interest to the users can be delivered. Unfortunately, in the case of broadcast and multicast content, there is little an advertiser can do. In some cases advertisements may be included in the broadcast on a regional or geographic basis but this allows for relatively limited targeting and does not allow for targeting down to the level of an individual household or user.

It should be appreciated that it would be desirable if a way could be developed to allow for targeted advertisements to be delivered to a household or individual playback device even when the playback device is receiving and playing broadcast or multicast content.

In order to target relevant advertising content to customers it is important for the advertisers and service providers to understand factors that are helpful in targeting advertisements suitable for individual customers or group of customers. For example, to send customized or selected advertising content to a customer watching some programming content, it is desirable that the service provider understand what programming content the user is currently watching and/or type of content that the user normally watches as personal information about the user or household such as age, sex, income level, etc.

Unfortunately, in broadcast delivery systems, the service provider, e.g., broadcaster, normally does not have the capability to track what a customer is currently watching and/or to which channel the customer premise device is tuned to. This is because the customer's device can simply tune to a channel and output the channel without reporting anything back to the broadcast or service provider. This is particularly the case in over the air broadcasts, analog broadcasts and/or other transmissions where there may not be a need or requirement for the user playback device to report back output/viewing information to the broadcaster.

In view of the above discussion, it should be appreciated that there is a need for developing methods and/or apparatus which would allow the service provider to obtain viewership information for subscribers that receive broadcast or multicast programming content. There is also a need for methods and/or apparatus for obtaining user information which can be used in targeting advertisements. There is also a need for methods and/or apparatus which would allow targeted advertisements to be delivered and displayed to a user, e.g., in real time, while a program is being output to the user.

SUMMARY

Methods and apparatus relating to the supply of targeted advertisements to user devices receiving broadcast or multicast content are described. In addition methods and apparatus for obtaining information which can be used to target advertisements to a viewer of broadcast or multicast content are described.

The methods and apparatus of the present invention are well suited for systems where content is broadcast or multicast to a plurality of user devices, e.g., set top boxes, TVs or other devices, with advertisements included in the content delivered via a first communications channel, e.g., a broadcast communications channel. Viewing information, e.g., information indicating the tuning of a customer premise device to a channel and/or the outputting of program content is reported to a headend or other device. While such information is normally not available, in accordance with various embodiments the customer premise device is configured to report such information thereby providing a device such as a server, information which can be used to target advertisements for the customer premise and/or specific user device known to be outputting program content.

One or more targeted advertisements are delivered to a customer premise device via a secondary channel that is different from a primary communications channel. In some embodiments the secondary channel is a unicast IP delivery channel with content being directed, e.g., addressed to an individual customer premise or customer premise device. Thus, while the user selected program content may be delivered via a broadcast channel or multicast channel, target advertisements are delivered via a unicast IP channel in at least some embodiments.

The customer premise device outputs and/or records user selected program content delivered via the first communications channel, e.g., broadcast or multicast channel.

In accordance with one aspect of the invention a customer premise device receiving programming content via the first channel, e.g., a broadcast or multicast digital channel, provides information that can be utilized by the service provider and/or a third party in targeting relevant advertising content to the customer premise device. In various embodiments such information includes information regarding the content being output, e.g., viewed by the customer, time of viewing, customer preferences and/or past viewing history and other related information. The customer premise device, e.g., set top box, may and in some embodiments does supply, age, sex, income level and/or other demographic or personal information corresponding to the user of the customer premise device that may be useful for purposes of ad targeting. In some embodiments the user information is entered into the customer premise device and supplied with the program viewing information to the server or headend device. In such embodiments the user has control over what information is provided for ad targeting purposes. In other embodiments the service provider, e.g., cable network headend operator, stores and supplies to an advertising system user information along with information obtained from the customer premise device indicating what broadcast or multicast content is being viewed and/or recorded.

Having received such information, e.g., from individual customer premise devices, the service provider system and/or authorized advertising party server can select targeted advertising content well suited for individual customers corresponding to the specific customer premise devices providing such information.

In various embodiments the targeted advertising content is provided to one or more customer premise devices via a secondary communications channel that is different from the communications channel over which the programming content was provided. In some embodiments the targeted (alternative) advertising content is communicated via a unicast Internet Protocol (IP) packet stream over the second communications channel. In various embodiments the customer device, e.g., set top box, monitors the content received on the first, e.g., broadcast channel to detect an upcoming commercial break. While content corresponding to the program being viewed is received on the first communications channel, alternative advertising content, e.g., targeted advertising content, may and sometimes will be received via the second communications channel, e.g., the unicast IP communications channel.

Thus the content received via the first channel is monitored to detect upcoming commercial breaks. An upcoming commercial break may be indicated by private data included in the content stream, one or more queue tones or through various other techniques.

When an upcoming commercial break is detected, a signal may be sent to a headend device and or an advertisement (ad) server to indicate that the user is viewing and/or recording the content being received on the broadcast channel providing the device an opportunity to communicate an alternative advertisement to the customer premise device via the second communications channel.

Alternatively in some embodiments a notification is provided when a user tunes to a program channel and the headend or advertising server assumes the user remains tuned to that channel for a period of time, e.g., the known duration of the program being supplied to the customer premise device via the first channel. In one such embodiment the ad server stores information about when advertisements occur in the program which has been identified as being received by a user device and send alternative advertisements for a period of time, e.g., the duration of the program, without the need for the customer premise device to report on upcoming commercial breaks. Such an embodiment is efficient in that it requires very little upstream communication from individual customer devices. While alternative advertisements may be provided for the duration of a program via a unicast stream, in other embodiments user inactivity is detected by the customer premise device, e.g., a failure to receive a control signal from a remote control for a predetermined period of time, and triggers the sending of a sleep state indicator to the headend or ad server causing the headend device or ad server to cease the unicast transmission of alternative ads to the customer premise device. In this way headend to customer device unicast transmission resources may be used efficiently as well as customer premise device to headend communications resources.

During a commercial break which occurs on the first channel, the customer device outputs the received alternative advertising content communicated via the secondary communications channel rather than outputting advertising content received via the first, e.g., broadcast, communications channel.

Program content received via the first communications channel may, and in some embodiments is recorded. Alternative advertising content may, and in some embodiments is, recorded in place of broadcast advertisements which were received with the programming content. In some embodiments both advertising and program content received via the first communications channel and advertising content received via the second communications channel is received and recorded, e.g., in the same program file. Advertising content received via the second program channel may include time constraints, e.g., the alternative ads may be intended to be displayed for a limited period of time relative to the original date of the broadcast or multicast program into which it was intended to be inserted in the place of an advertisement included in the original broadcast or multicast program. For example an advertisement may be for a limited time offer in which case there would be no reason to display the advertisement after the limited time of the offer has expired.

In at least some embodiments where original broadcast or multicast ad content is recorded in addition to alternative ad content communicated via a second communications channel, the original broadcast or multicast advertisement is displayed rather than the alternative ad content when a playback constraint associated with the alternative advertisement is not satisfied.

Normally alternative advertisements which are output during the delivery time period of a program will be displayed if the recorded content is played back with a time period that is in close proximity to the original broadcast time, e.g., within a time period from the broadcast time, at least as long as the original program. This ensures that a viewer rewinding or pausing a program will likely see the alternative advertisement at least during the initial viewing and any rewinding or repeat playback occurring during the initial viewing. This avoids, by making sure that the same advertisement is displayed, the possibly unsettling effect a user may encounter from a different ad being displayed during a pause or rewind operation that may result in a repeat playback of a portion of a broadcast program close to the initial air time if such a playback constraint was not implemented.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

It should be appreciated that numerous additional variations and embodiments are possible and remain within the scope of the invention.

Various additional features, embodiments and advantages of the present invention are discussed in the detailed description which follows.

BRIEF DESCRIPTION OF THE DRAWINGS

FIG. 2 is a drawing comprising a combination of FIGS. 2A and 2B.

DETAILED DESCRIPTION

Figure 1:
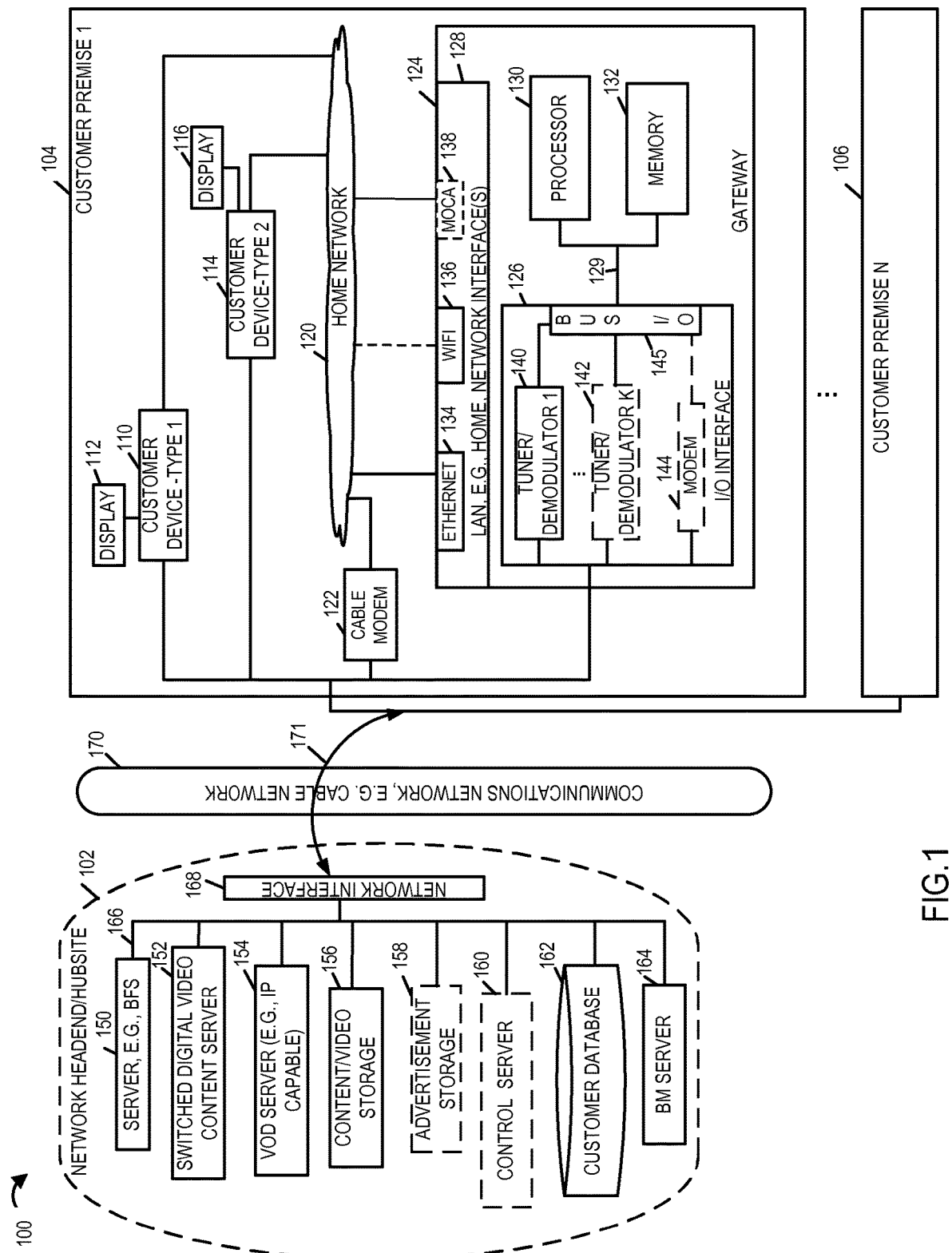
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a network headend 102, a communications network 170, e.g., a hybrid fiber-coaxial (HFC) network, satellite network, and/or internet, and a plurality of customer premises 104, 106. In various embodiments the content, e.g., multimedia content, is delivered from the headend 102 over the communications network 170 to one or more devices at the customer premises 104, 106 depending on the customer device capability and/or user preference. In some embodiments the customer premises 104, 106 include a variety of devices including, e.g., legacy set top box (STB) devices as well as switched digital video STB devices.

The network headend 102 may be implemented at a cable network office or hubsite serving a plurality of customer premises and includes multiple servers and databases which are coupled together as shown. In the FIG. 1 example, the headend 102 includes a content broadcast server 150, e.g., a broadcast file server (BFS), a switched digital video (SDV) content server 152, a video on-demand (VOD) server 154, a content storage 156, an advertisement storage 158, an IP capable control server 160, a customer database 162 and a business management server 164. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166. The local network 166 is coupled via one or more network interfaces 168 to other networks and/or devices. For example, the headend 102 is coupled via network interface 168 to communications network 170, e.g., a cable network, and may also be coupled to one or more other external networks.

Via the network 170, the elements shown in the network headend 102 can send and/or exchange various information with the devices located at the customer premises 104, 106. As shown in FIG. 1, communications link 171 traversing the communications network 170 couples the CPEs at the customer premises 104, 106 to the various elements/servers shown in the network headend 102.

The content server 150, e.g., a broadcast file server (BFS), among other things, is responsible for delivering, e.g., broadcasting, content including program content and advertising content and/or other information to one or more customer devices, e.g., set top boxes, which support receiving content by tuning to, e.g., QAM broadcast stream broadcast by the server 150. The switched digital video (SDV) content server 152 provides digital content to customer devices which support receiving SDV content. In various embodiments the content servers 150, 152 access the programming content from the content storage 156 and generate transport streams suitable for delivery to various CPEs via the communications network 170. The content storage 156 stores content, e.g., audio, video and/or other multimedia content. In some embodiments the content stream is encrypted prior to delivery to the CPEs over the communications network 170. The VOD server 154 is responsible for responding to on-demand requests and delivering, on-demand programming content including ordered by one or more customers and/or other information to one or more customer devices, e.g., set top boxes. In some embodiments the VOD server 154 is configured to deliver targeted advertising content to one or more customer premises via an IP channel and/or a VOD channel.

The advertisement storage 158 includes a cache of advertisements that can be included in the content transport streams delivered by the various servers.

The control server 160 is optionally included in the headend 102 and may reside externally. The control server 160 in some embodiments is configured to send targeted advertisements via unicast IP packet streams over an IP channel to one or more customer premises. The advertisements targeted to the customers may be selected from the advertisement storage 158, e.g., based on customer profiles and/or other relevant information obtained from the customers in accordance with the invention.

The customer database 162 includes, for a plurality of customers, customer information, e.g., customer profile, customer account information and information regarding the devices installed at customer premises. In some embodiments customer account information includes, e.g., account number, subscription/service information, customer device capability and other billing related information. Customer database 162 also includes customer device information, e.g., identification and/or other information regarding customer devices such as STBs, gateway devices, modems etc., installed at various customer premises served by the headend 102. BM (Business management) server 164 processes billing information corresponding to customers serviced by the headend 102. This may include updating billing charge information in response to changes in services being provided to the customer, upgrades, on-demand content purchases, and/or other activity.

Referring now to the customer premises shown in system 100. Each customer premise 104, 106 may include a plurality of CPEs including playback devices. In various embodiments the CPEs located at the customer premises include, e.g., modems, gateway devices, routers, and playback devices including, e.g., set top box, internet capable TVs, personal computers, laptops, tablet devices, smart phones etc. In various embodiments a content playback device presents the program content to a viewer, e.g., customer/subscriber. FIG. 1 shows some details of customer premise 1 104. Customer premise N 106 may be similar to the customer premise 104 and may include same or similar CPEs.

Figure 5:
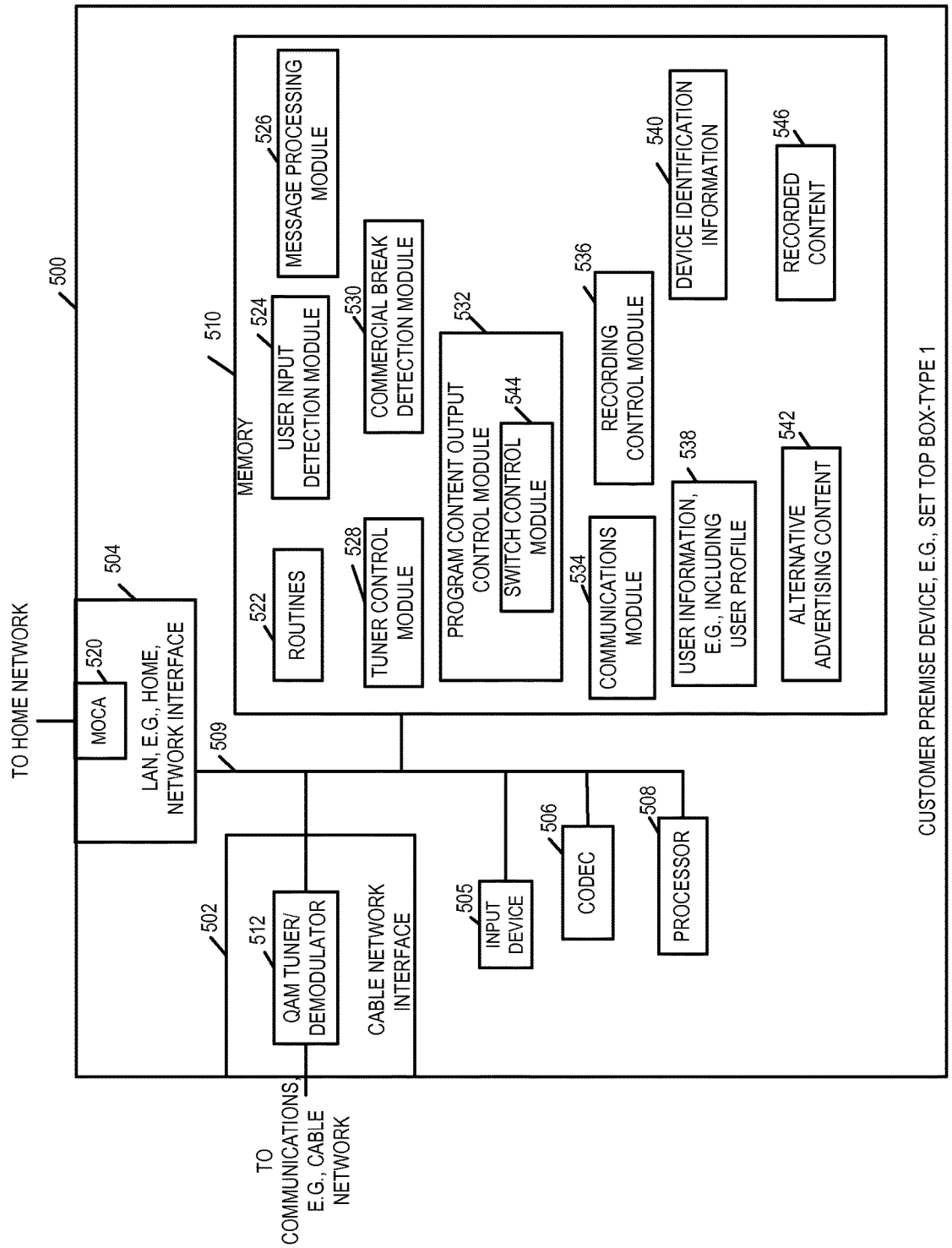
FIG. 5 illustrates an exemplary customer device, e.g., a set top box, of a first type implemented in accordance with an exemplary embodiment.
Figure 6:
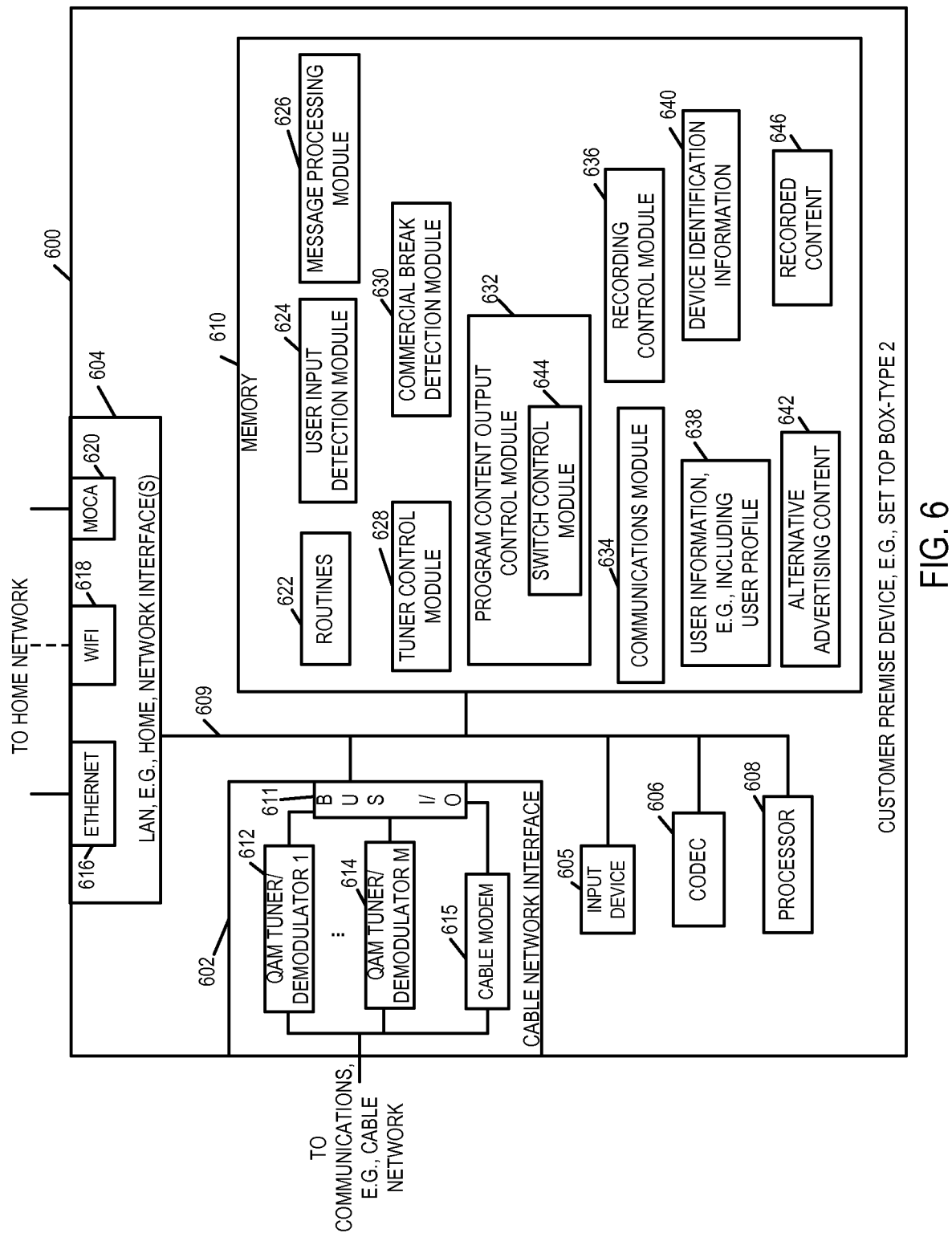
FIG. 6 illustrates another exemplary customer device, e.g., a set top box, of a second type implemented in accordance with an exemplary embodiment.

The customer premise 104 includes an exemplary gateway device 124 and different types of customer devices, e.g., set top boxes, including a customer device-type 1 110 and customer device-type 2 114 which are discussed in greater detail in FIGS. 5-6. Thus it should be appreciated that a variety of devices and set top boxes may exist at a single customer premise where the devices may be coupled together by a home network 121. The various types of devices and the presence of a gateway 124 in addition to a cable modem 122 provide multiple alternative ways in which individual set top boxes may receive content either directly from the servers 150, 152, 154, 160 of the headend 102 or via the gateway device 124 over the home network 121 after the gateway device 124 performs processing, e.g., transcoding/transrating.

As shown, the customer device 110 is coupled to display device 112, customer device 114 is coupled to display device 116. It should be appreciated that in some embodiments customer devices can be integrated in a device which also includes a display. The display devices could be, e.g., standard televisions. In some embodiments the customer devices, e.g., STBs, at the customer premises may include, e.g., a legacy STB, a DOCSIS (Data Over Cable Service Interface Specification) set top box, an SDV capable set top box, and/or a hybrid set top box. In some embodiments the customer premises 104, 106 may include IP capable devices like ipads, laptops, smart phones etc., which are capable of receiving IP program content streams and performing playback. The SDV capable set top box devices support receiving SDV programming content from the SDV server 152 while the legacy STBs receive programming content via a QAM broadcast stream from BFS 150.

In the illustrated embodiment of FIG. 1, the exemplary gateway device 124 includes, among other things, an I/O interface 126 with at least one tuner/demodulator pair 140, a processor 130 and a memory 132 coupled together by a bus 129. In some embodiments the I/O interface 126 includes a cable modem 144 and/or a plurality of additional tuners and demodulator pairs such as tuner/demodulator pair K 142, as indicated in the figure, which are coupled to the bus 120 via the bus I/O interface 145. Each tuner/demodulator pair can be used to tune to a frequency band to receive video and/or data content from the BFS 150, SDV 152 and/or VOD server 154. In some embodiments the gateway device 124 receives, via the cable modem 144, programming content via unicast IP streams from the IP capable control server 160. In some embodiments the gateway 124 includes one or more tuner/demodulators but does not include the cable modem 144. In still other embodiments the gateway 124 includes both tuner/demodulator pairs 140 through 142 and cable modem 144. The memory 132 includes various control routines, modules and data/information. The operation of the exemplary gateway device 124 is discussed later in more detail.

In accordance with one aspect of some embodiments, targeted advertising content is delivered to various customer premise devices over a separate communications channel than the communications channel over which programming content is being delivered. Prior to the targeted advertising content being delivered, the customer devices send back information regarding the content being played back by the customer and/or other customer information. The customer devices receiving the targeted advertising content switches, e.g., at the time of a commercial break, to outputting the advertising content received over the separate channel.

Figure 2A:
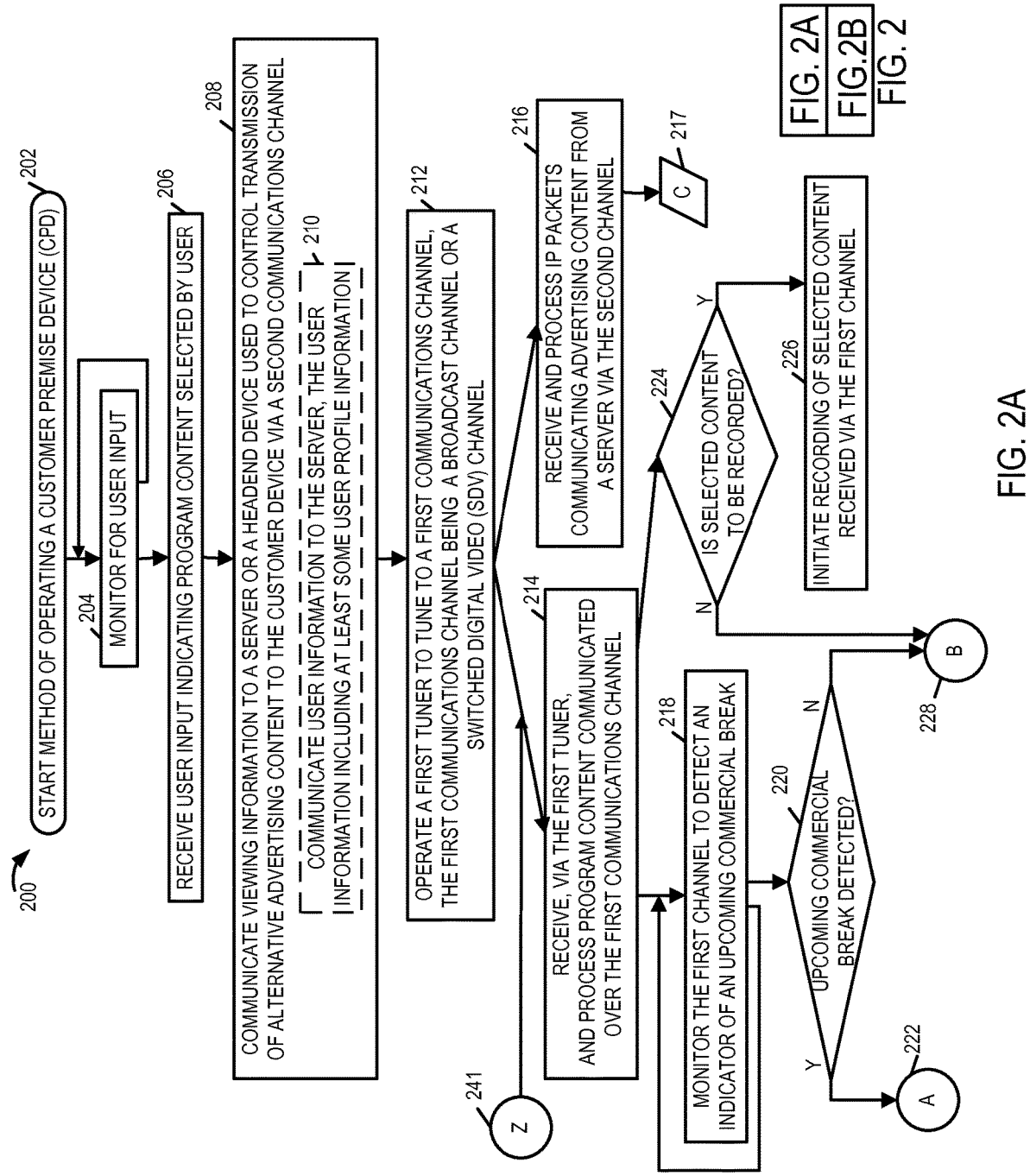
FIG. 2A is a first part of a flowchart illustrating the steps of an exemplary method of operating a customer device, e.g., a set top box, in accordance with an exemplary embodiment implemented using the system shown in FIG. 1.
Figure 2B:
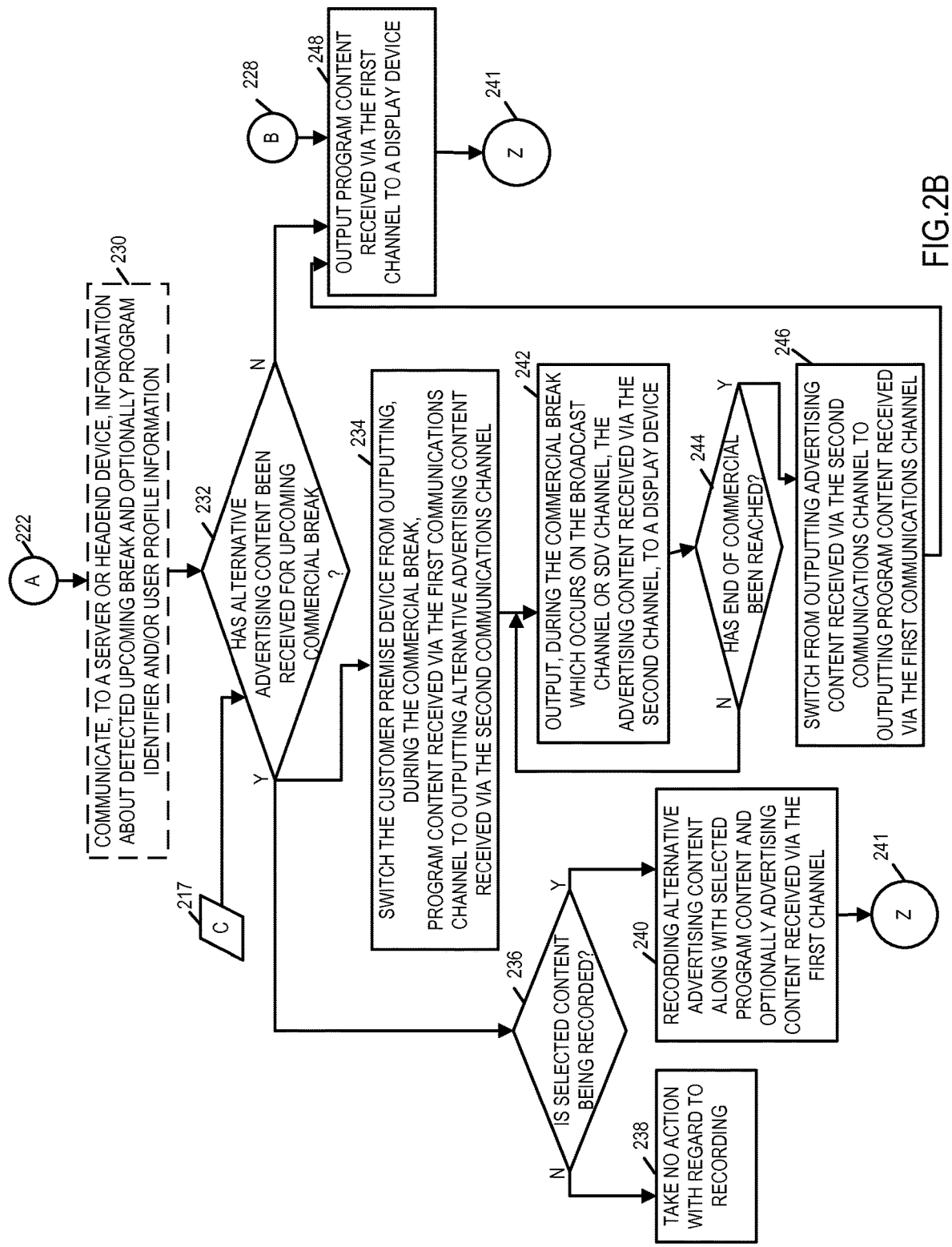
FIG. 2B is a second part of a flowchart illustrating the steps of an exemplary method of operating a customer device, e.g., a set top box, in accordance with an exemplary embodiment implemented using the system shown in FIG. 1.

FIG. 2, which comprises a combination of FIGS. 2A and 2B, is a flowchart 200 illustrating the steps of an exemplary method of operating a customer device, e.g., a set top box, in accordance with an exemplary embodiment implemented using the system shown in FIG. 1. In some embodiments the customer device implementing the method is, e.g., one of the customer devices 110 or 114 shown in FIG. 1.

The method starts in step 202, e.g., with the customer device, e.g., set top box, television or other playback device, being powered on. In step 204 which is performed on an ongoing basis the customer premise device monitors for user input. The user input maybe, e.g., input indicating selection of program content such as selection of a program channel providing broadcast or multicast program content. In step 206, input is received, e.g., a signal from a remote control device, indicting program content selected by a user. The content selection may be made via selection of program channel of a program guide or using, for example, up and down channel keys of a remote control to select a desired program channel. By selecting a broadcast or multicast program channel the user selects the content being provided via the program channel.

With a program content selection having been received and detected in step 206 operation proceeds to step 208. In step 208 the playback device implementing the method communicates viewing information, e.g., user program selection information, to device, e.g., a server or other headend device, used in controlling transmission of alternative advertising content to a customer premise device via a second communications channel, e.g., a unicast communications channel such as an IP unicast channel. Alternative advertising content may be sent in packets addressed to the playback device using an IP address of the playback device or to a gateway device located at the customer premise at which the playback device is located for delivery of the content in the IP packet stream to the playback device. The alternative content may be transcoded and/or transrated by a gateway device prior to delivery to the playback device via a home network. While a gateway device may be used in the delivery of the targeted advertisement, in other embodiments the alternative content is delivered directly to the playback device via a unicast communications channel which is received and processed by the playback device. Thus, the playback device implementing the method 200 will receive user selected broadcast or multicast content via a first communications channel, e.g., a broadcast or multicast communications channel and alternative advertising content via a secondary, e.g., unicast communications channel.

In at least some embodiments the playback devices stores user information such as user demographic information such as age, race, etc., which is communicated in step 210 to the device to which the viewing information is communicated. In this manner an ad targeting device or system is supplied with sufficient information to selected targeted advertisements and can determine the context, e.g., program, in which the targeted advertisements are to be displayed. While in some embodiments the playback device, e.g. set top box, stores and provides user demographic information, in other embodiments such information is stored by a server in the network headend and is supplied to an advertising system or device along with the information indicating the broadcast or multicast viewing information known to the headend device based on the signal or signals received from the playback device, e.g., set top box.

Operation proceeds from step 208 to step 212 wherein the customer premise playback device implementing the method controls a tuner to tune to a first communications channel used to supply the user selected content. The first communications channel maybe, and in at least some embodiments is, a broadcast communications channel. In other embodiments the first communications channel is a multicast communications channel, e.g., a switched digital video channel or another such channel supplied to multiple user devices at different customer premise locations.

Operation proceeds from step 212 to steps 214 and 216 which may, and often do occur in parallel. In step 214 the playback device receives, via the first tuner, program content communicated over the first communications channel. The program content will, and often does, include advertisements which are not targeted to an individual user but which are broadcast or otherwise delivered to multiple users as part of a multicast. Thus, a user device may receive via a broadcast channel to which the first tuner is tuned broadcast program content and advertisements. The broadcast program content may, and in some embodiments does, include information identifying upcoming commercial breaks and may also include information about the duration of such breaks. Such information can be conveyed in a private data field or otherwise encoded in the video information. Alternatively queue tones may be used to indicate the presence of a commercial break.

Operation proceeds from step 214 to steps 218 and 224.

In step 218 the content received via the first communications channel, e.g., the broadcast or multicast communications channel, is monitored to detect an indicator of an upcoming break. As noted above the indicator may be commercial information embedded or encoded in the content received via the first communications channel. The monitoring for an upcoming commercial break is performed on an ongoing basis as indicated by the arrow returning to the top of step 218 with processing proceeding to step 220 on a regular basis where a decision is made as to whether an upcoming commercial break has been detected by the monitoring performed in step 218.

If an upcoming commercial break has been detected in step 220 operation proceeds directly to step 232 via connecting node A 222 or to optional step 230 when step 230 is implemented by the playback device implementing the method. If no upcoming commercial break has been detected in step 220, operation proceeds to step 248 via connecting node B 228.

Returning to step 224. In step 224 it is determined if the user selected content received via the first communications channel is to be recorded, e.g., based on a user scheduled recording. If the selected content is to be recorded the operation proceeds from step 224 to step 226. In step 226 the customer device initiates recording of the content received via the first communications channel. If in step 224 it is determined that the content is not to be recorded the operation proceeds from step 224 to step 248 via connecting node B 228.

Returning to step 230. In step 230, the playback device communicates to the server or headend device used to control the supply of alternative advertisements information about the detected upcoming commercial break. Program identifier and/or user profile information may be performed in optional step 230. It should be appreciated that step 230 can be preformed as an alternative to or in addition to step 208 since via either step the headend or server controlling the supply of alternative advertisements is provided with information about the content being output and thus viewed, by a user of the playback device implementing the method. In some embodiments the device supplying the targeted advertisements does so in response to the information received in step 230. However, in other embodiments the alternative advertisement server supplies multiple advertisements throughout a program once it is informed of a user selected program in step 208 without the need for information, e.g., messages, of the type sent in step 230. While the ad server can determine what advertising opportunities are available during a selected program based on known information about the program and its content, sending advertisements without the information relating to a specific advertisement break may result in more alternative advertisements being unicast than are likely to be used since a user may have powered off the playback device after the program selection. In some embodiments in which alternative advertisements are provided for an entire program, the playback device is configured to report a power off operation or detection of a period of user inactivity and to information the headend device or ad server of the detection of such an event. In response to being informed of a power off operation or a period of user inactivity exceeding a predetermined amount, the ad server or other headend device will terminate the unicast alternative advertisement stream to the user thereby conserving downlink transmission resources.

Operation proceeds from step 230 in embodiments where it is implemented to step 232. An input to step 232 is the data represented as data, e.g., alternative advertisement content and in some embodiment display condition information, received and recovered from the second communications channel. Element C 217 represents the alternative ad content and other information, e.g., ad presentation constraint information, received via the second communications channel.

In step 232 a determination is made as to whether or not alternative advertising content has been received for the detected upcoming commercial break. If alternative advertising content has not been received via the second communication channel, e.g., the unicast communications channel, operation proceeds from step 232 to step 248.

In step 248 the program content received via the first communications channel is output to a display device. Thus, in the case where an alternative advertisement has not been received via the second communications channel, the commercial received via the first communication channel will be output.

If, however, in step 232 it is determined that alternative advertising content was received for the upcoming commercial break, operation proceeds to steps 236 and step 234. In step 234 a check is made to determine if the selected content is being recorded. If the selected program content is not being recorded, operation proceeds to step 238 and no action is taken with regard to recording, i.e., the program content received via the first communications channel and program content received via the second communications channel will not be recorded.

However, if in step 236 it is determined that recording has been enabled, operation proceeds to step 240 wherein the alternative program content is recorded with the selected program content. In some embodiment both the broadcast or multicast advertisement received via the first communications channel will be recorded with the main program content received via the first communications channel along with the alternative program content. In other embodiments only the alternative program content will be recorded. In embodiments where both broadcast commercial break content received via the first communication channel and alternative commercial content received via the second communications channel a single one of the broadcast and alternative content will be presented during playback to avoid altering the overall duration of the program during playback. Whether or not the broadcast or alternative commercial content is output during playback may, and in some embodiments does, depend on one or more playback constraints stored with the alternative commercial content. The alternative commercial content playback constraint may, and in some embodiments is a time constraint restricting the period of time in which the alternative commercial content will be presented. In other embodiments the playback constraint is a number presentations constraint with a playback counter being incremented each time the alternative add is presented and updated count being stored with the alternative add content and the broadcast program content. After a maximum number of presentations specified by the alternative ad constraint is satisfied the alternative ad will no longer be presented. In this manner a advertising can pay for the right to obtain a maximum number of presentations with the original broadcast ad being presented instead of the alternative advertisement once the paid for maximum number of presentations of the alternative advertisement has been satisfied on the playback device implementing the method.

Operation is shown proceeding from step 240 to steps 214, 216 via connecting node Z 241 to show that the receipt and processing of content via the first and second channels occurs on an ongoing basis while the playback device is powered on and used to output content, e.g., to a display device being viewed by a user of the playback device implementing the method shown in FIG. 2.

As noted above, in addition to proceeding from step 232 to step 236, when alternative advertising content has been received for an upcoming commercial break operation will also proceed from step 232 to step 234.

In step 234 the playback device switches the customer premise device from outputting, during the detected commercial break, content received via the first channel, e.g., the broadcast channel, to outputting content received via the second channel, e.g., the unicast channel. Thus, the alternative commercial content received via the second communications channel, e.g., the unicast channel, will be output rather than the content received via the first communications channel, e.g., the broadcast or multicast channel.

Operation proceeds from step 242 to step 244 in which a check is made as to whether the end of the commercial break for which alternative advertisement content was received has been reached. If the end of the commercial break has not been reached operation proceeds again to step 242 for the output of more alternative advertising content. However, if the end of the end of the commercial break has been reached operation proceeds to step 246 wherein the playback device switched form outputting the alternative advertising content received via the second communications channel back to outputting the content, e.g., main program content, received via the first communication channel.

Operation proceeds from step 246 to step 248 wherein the program content receive via the first communications channel is output to a display device. The output from step 248 to connecting node Z 241 indicates that processing including the receipt and output of program content will continue until the playback device is powered off or output of content is halted for some other reason.

Figure 3:
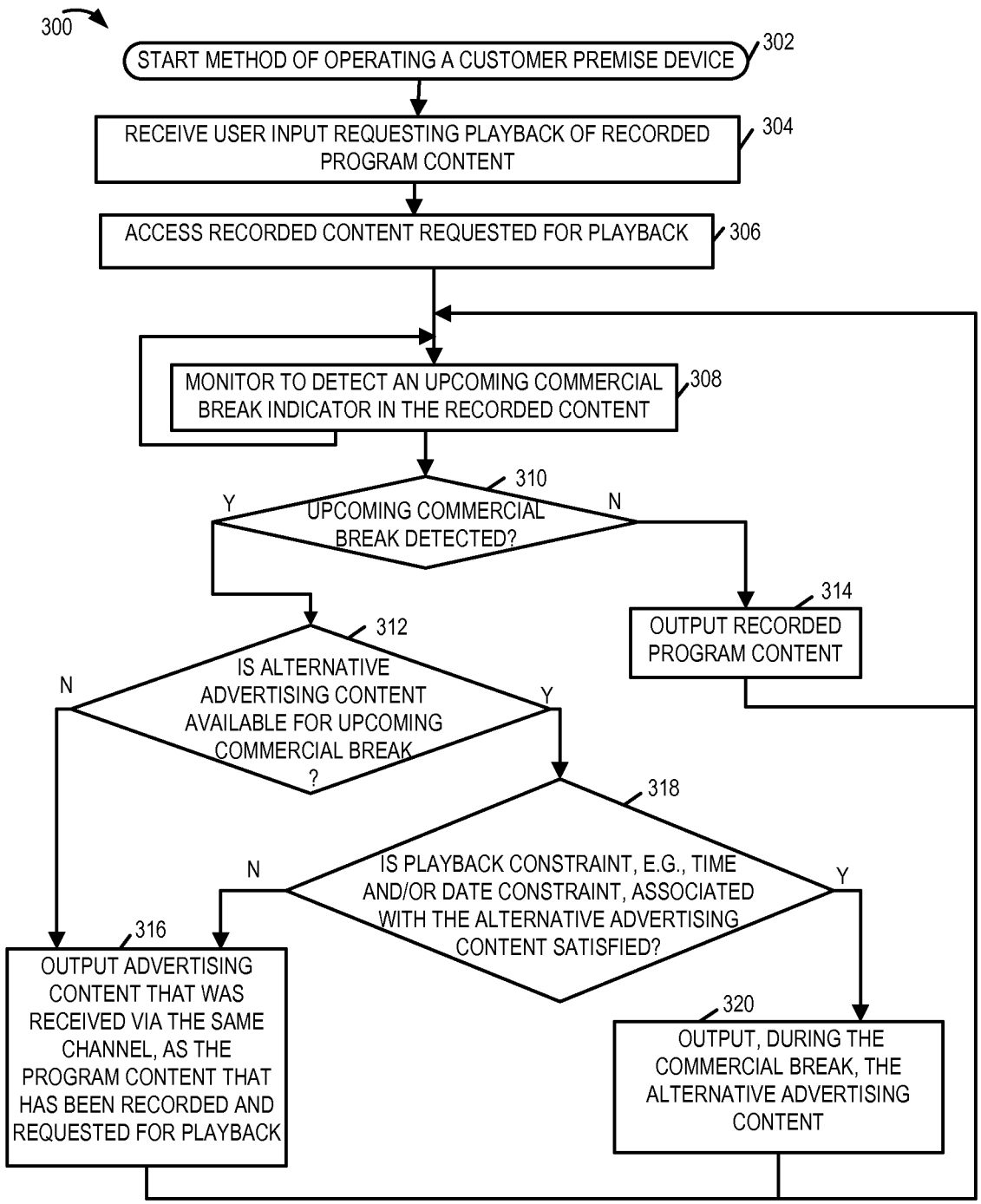
FIG. 3 is a flowchart illustrating the steps of an exemplary method of operating a customer device to playback recorded content, in accordance with an exemplary embodiment of the invention.

FIG. 3 illustrates a method 300 where the playback device which implements the method shown in FIG. 2 is used to read and output recorded program content rather than output content received via a broadcast communications channel in real time as the broadcast content is received.

The method starts in step 302. In step 304 user input requesting playback of recorded program content is received and processed. The input may be one or a combination of signals from a remote control device indicating the selection of a previously recorded program for viewing.

In step 306 the recorded program content is accessed, e.g., read or otherwise retrieved from memory or another storage device. Operation proceeds from step 306 to step 308. In step 308 the playback device monitors the content being played back for an indicator indicating an upcoming commercial break. This may be done in the same manner as previously described with regard to monitoring the content received on the first communications channel to detect an upcoming commercial break.

In step 310 a check is made as to whether an upcoming commercial break was detected by the monitoring performed in step 308

Operation proceeds form step 310 to step 314 if an upcoming commercial break was not detected by the monitoring of the recorded content being processed and output to a display. In step 314 the recorded program content is output.

If in step 310 it is detected that there an upcoming commercial break, operation proceeds to step 312. In step 312 a check is made as to whether alternative advertising content is available for the upcoming commercial break, e.g., if at least two advertisements (e.g., the broadcast or multicast advertisement and the alternative unicast advertisement) are available for decoding and display during the upcoming commercial break.

If alternative advertising content is not available, operation proceeds from step 312 to step 316 in which the recorded program content is output. Thus, in step 316 the content received via the first communications channel will be output unless an alternative advertisement was recorded rather than broadcast or multicast content without recoding of the broadcast/multicast advertisement.

If in step 312 it is determined that alternative advertising content is available for the upcoming commercial break, operation proceeds from step 312 to step 318. In step 318, assuming there is a playback constraint associated with the alternative advertisement, the playback constraint is checked to see if it is satisfied. The alternative playback constraint may be a time constraint, a maximum number of presentations constraint or some other constraint.

If the alternative advertisement constraint is satisfied operation proceeds from step 318 toe step 320 in which the alternative advertisement is output for the duration of the detected commercial break. However, if the alternative advertisement constraint is not satisfied, operation proceeds to step 316 and the broadcast or multicast advertisement received via the first communications channel will be output.

Arrows from step 316 to step 320 leading back to step 308 indicate that after the commercial break main program content will be processed and output pending detection of another commercial break in step 308.

It should be appreciated that the methods described in FIGS. 2 and 3 allow for targeted advertisements to be directed to specific individual users known to be receiving and outputting broadcast or multicast content while other users whose playback devices can not support such targeted advertisement delivery or which are not to be targeted for other reasons such as the failure to get a targeted ad sponsor interested in paying for a targeted ad directed to the user will receive a broadcast or multicast advertisement included as part of the normal content delivered via the user selected broadcast or multicast content delivery channel.

In the present application it should be appreciated that content can include video content such as TV programs, movies, news, etc. and/or audio content such as radio programs or music channels.

Figure 4:
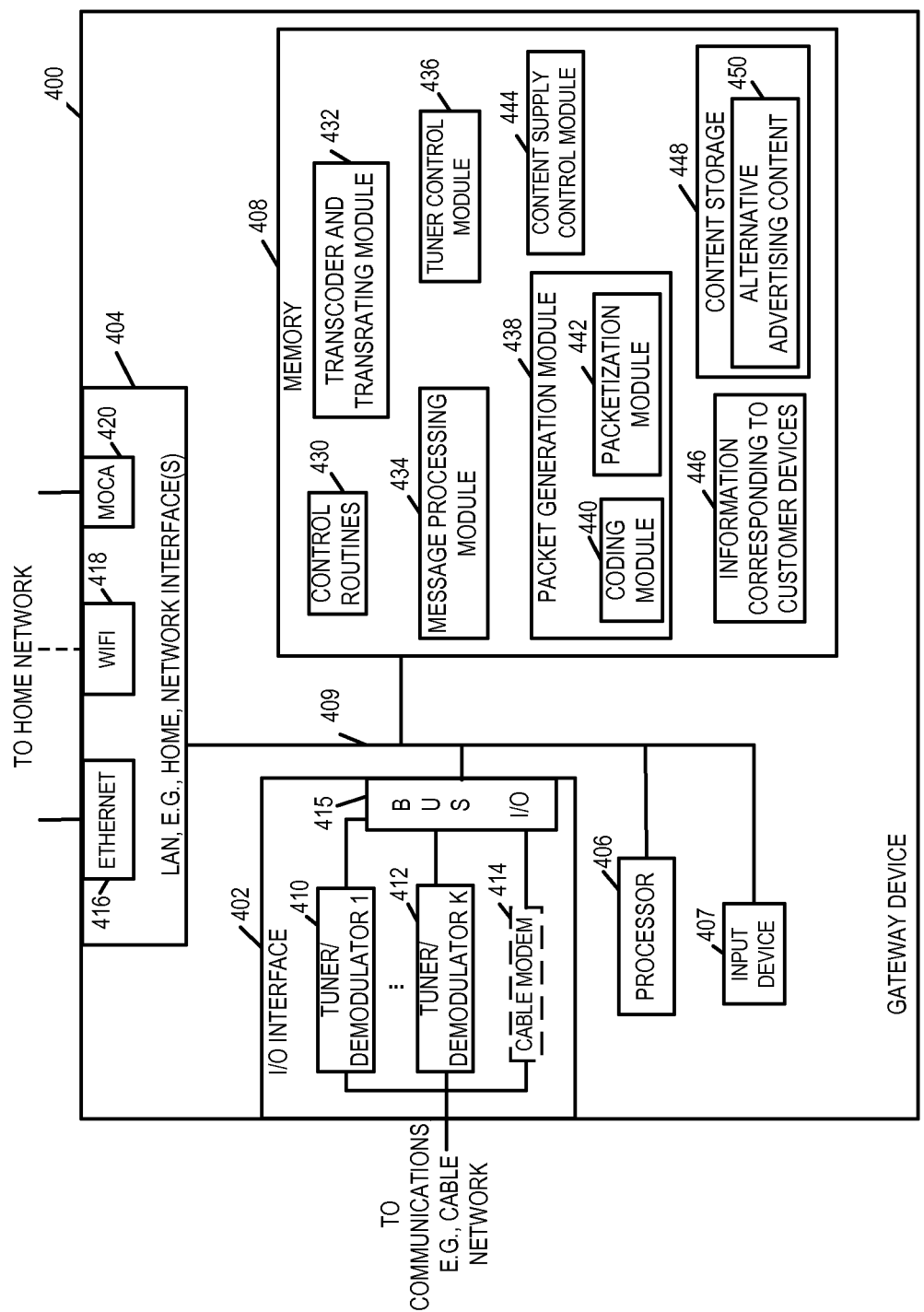
FIG. 4 illustrates an exemplary gateway communications device implemented in accordance with some exemplary embodiments.

FIG. 4 illustrates an exemplary gateway communications device 400 and various elements of the gateway device in greater detail. The exemplary gateway communications device 400 can be, and in some embodiments is, used in the various customer premises shown in FIG. 1. The gateway device 400 can be used as the gateway 124 of FIG. 1. For the purpose of discussion consider that the gateway device 400 is located at a customer premise including a plurality of customer devices including set top boxes which normally receive content from the content servers in the headend 102.

In accordance with one aspect of some embodiments the exemplary gateway device 400 receives alternative advertising content from the headend 102, e.g., via IP packets communicated via a second communications channel, from the IP capable control server 160. In accordance with the features of some embodiments the gateway device 400 processes the received unicast IP stream communicating the alternative advertising content to put it in a format suitable for receiving by the customer devices, e.g., STBs. The gateway device 400 serves to provide the alternative advertising content received via unicast IP stream to some customer devices, e.g., such as the legacy STB devices, which may otherwise not be able to receive the alternative advertising content via unicast IP streams due to the inability of these devices to support communications over IP.

In various embodiments the alternative advertising content is delivered to one or more customer devices collocated at the customer premise, e.g., over a local home network such as home network 121. In some embodiments the gateway device 200 is configured to perform transcoding and/or transrating operation prior to delivering the alternative advertising to playback devices. In some embodiments as part of the process the gateway device demodulates and/or decodes the received alternative advertising and then generates a content stream including the alternative advertising content suitable for delivery to the customer devices. The method used by the gateway 400 for generating the alternative advertising content stream is based on the destination customer device with different devices receiving content which is coded differently, e.g., based on the codecs they support and/or the bandwidth, data rates etc., they can support.

As shown, the gateway device 400 includes a cable network interface 402, a local area network (LAN) interface 404, a processor 406, an input device 407, and a storage device, e.g. a memory 608, coupled together via a bus 409. The various elements of the gateway device 400 can exchange data and information over the bus 409.

The cable network interface 402 includes at least one tuner/demodulator pair QAM tuner/demodulator 410, and a cable modem 414, e.g., a DOCSIS modem. In some but not all embodiments, a plurality of additional tuner/demodulator pairs such as tuner/demodulator pair K 412 are included as indicated in the figure, which are coupled to the bus 409 via the bus I/O interface 415. Via the interface 402, the gateway device 400 can exchange signals and/or information with other devices and/or system elements such as the servers in the network headend 102, over the communications network 170. Thus the cable network interface 402 supports the receipt and/or transmission of content, and/or other information from/to different servers over the network 170. In various embodiments the cable network interface 402 also includes a transmitter to transmit content over the communications network 170 in addition to the tuner/demodulators which are used to receive content. The QAM tuner-demodulator 410 is capable of tuning to a frequency band to receive content stream and demodulating the received content and/or information. The tuner/demodulator 410 works under the control of processor 406 and the tuner control module 436. In the illustrated embodiment the gateway device 400 includes a cable modem 414 that enables receiving content, e.g., advertising and/or programming content, via IP streams from the IP capable servers, e.g., servers 156, 160. The received content can be stored, processed and/or supplied to one or more customer devices, e.g., via the home network.

Via the LAN interface 404, e.g., home network interface, the gateway device 400 can exchange information with other various customer premise equipments such as, e.g., the STB devices collocated at a customer premise, via the local network, e.g., home network 121. The LAN interface 404 supports the receipt and/or transmission of content, and/or other information over the home network from/to the various custom premise equipments. In some embodiments the home network may be, e.g., Ethernet, WiFi, MoCA (Multimedia over Coax). The LAN interface 404 includes an Ethernet interface 416, an integrated WiFi modem 418 and a MoCA interface 420. In some embodiments the alternative advertising content received via the I/O interface 402 is processed and then at least a portion of the alternative advertising content is supplied to a collocated customer device, e.g., a legacy STB, via the LAN interface 404 (e.g., using MoCA interface 420) over the local home network 121.

The input device 407 may be a keypad, touch screen, and/or a microphone for receiving and processing voice input commands. The processor 406, e.g., a CPU, executes routines 430 and one or more modules and controls the gateway 400 to operate in accordance with the invention. Thus to control the gateway device 400, the processor 406 uses information, various modules and/or routines including instructions stored in memory 408.

In addition to the routines 430, the memory 408 includes a transcoding and transrating module 432, a message processing module 434, a tuner control module 436, a packet generation module 438, content supply control module 440, information corresponding to customer devices 442, and stored alternative advertising content 444.

Routines 430 include communications routines and/or device control routines. In some embodiments the gateway device 400 performs transcoding and transrating operation on the received alternative advertising content, prior to supplying the alternative advertising content to a customer device, so that the content is in a format (e.g., encoding and/or data rate) that is supported by the receiving device. The transcoding and transrating module 432 is configured to perform transcoding and transrating operation on the content in accordance with the invention.

The message processing module 434 is configured to process various messages and/or signals received by the gateway device 400. The received messages and/or signals include messages, instructions and/or other signals received from headend 102 and from the customer devices, e.g., STBs. For example in some embodiments the message processing module 434 receives a message from the control server 160 in the headend 102 to receive alternative (e.g., targeted) advertising content and supply at least a portion of the advertising content to one or more customer devices located at the customer premise where gateway 400 is located. The gateway device 400 processes the received messages and provides information to the processor 206 and/or one or more other modules to take further action in response to the received messages. In some embodiments the gateway 400 receives the alternative advertising content from a video on demand server 154.

The tuner control module 436 controls the tuner-demodulator pairs 410, 412 to given tune to a channel, receive and demodulate content, by providing them with information and/or parameters needed to tune to the channel, e.g., one of a QAM broadcast channel, SDV delivery channel, or VOD delivery channel.

The packet generation module 438 is responsible for generating unicast packets from the received content. In various embodiments the packet generation module 438 includes a coding module 440 and a packetization module 442. The coding module 440 is configured to encode the program content according the coding standards supported by the customer devices to which the generated unicast packets are to be provided. The information regarding the customer devices including information about supported coding standards, data rates, physical device addresses etc., corresponding to the devices at the customer premise where gateway 400 is located is obtained by the gateway device 400 and stored as information 446 in the memory 408. The packetization module 442 is configured to packetize the content encoded by the coding module 440 in accordance with the coding standard supported by the customer device to which the packets are to be transmitted.

The content supply control module 444 controls the supply of content, e.g., alternative advertising content and/or other program content, to the customer devices over the local, e.g., home, network via the LAN interface 404. For example the content supply control module 232 controls a transmission of alternative advertising content corresponding to a first customer device, e.g., a first STB, to the first device and alternative advertising content corresponding to a second device, e.g., a second STB, to the second device.

The content storage 448 includes stored content, e.g., received from a headend device or server via the cable network 402, including alternative advertising content 450. In some embodiments the gateway device receives the alternative advertising content 450 from the headend device or server via a unicast Internet Protocol (IP) packet stream over a communications channel.

In some embodiments, the gateway device 400 and other customer devices support DLNA and/or are DLNA compliant devices. In some embodiments the gateway device 400 is a DOCSIS 3.0 compatible gateway device which includes a DSG (DOCSIS Set-top Gateway) agent and which serves as a CMTS (cable modem termination system). While in FIG. 1 embodiment the gateway device 124 is shown to be located at the customer premise, it may and in some embodiments is, located outside the customer premise, e.g., at a hubsite, which serves the customer premise.

FIG. 5 illustrates an exemplary customer device 500, e.g., a set top box, of a first type implemented in accordance with one exemplary embodiment. In some embodiments the customer device 500 is configured to implement the method of flowcharts 200 and 300 in accordance with the invention. For the following discussion the customer device 500 of the first type will be referred to as STB 500. The STB 500 may be used in any one of the customer premises shown in FIG. 1, e.g., as the customer device-type 1 110. The STB 500 may be, and in some embodiments is, coupled to a display device, e.g. a monitor and/or a Television (TV). As discussed below in detail the STB 500 of the first type supports communications, e.g., with external devices located external to the customer premise, using standard QAM based communications channels but does not include a cable modem interface to receive unicast IP packet stream.

The STB 500 includes a cable network interface 502, a local area, e.g., home, network interface 504, input device 505, a codec (Coder/Decoder) 506, a processor 508, and a memory 510 coupled together via a bus 509. The various elements of the customer device 500 can exchange data and information over the bus 509.

Via the cable network interface 502, the STB 500 can exchange signals and/or information with other devices and/or system elements such as the servers in the network headend 102, over the communications network 170. Thus the cable network interface 52 supports the receipt and/or transmission of content, application data and/or other information from/to different servers and/or headend devices, e.g., the BFS server, etc. The cable network interface 502 includes a QAM tuner/demodulator 512 capable of tuning to a frequency band to receive content stream and demodulating the received content and/or information. The tuner/demodulator 510 works under the control of processor 508 and the tuner control module 528. Although one tuner/demodulator 510 is shown for simplicity, additional tuner/demodulator pairs may be used in some embodiments. In various embodiments the STB 500 receives content stream including programming content and advertising content communicated over a first communications channel. In some embodiments the first communications channel is, e.g., a broadcast channel or multicast digital channel.

In some embodiments the interface 502 also includes, e.g., an infrared signal receiver to receive signals from a user remote control device. The cable network interface 502 of the STB 500 does not support receiving of packetized IP content, e.g., over an IP based channel, from an external server via the cable interface 502. In various embodiments the cable network interface 502 also includes a transmitter to transmit content, e.g., over the communications network 170 in addition to the tuner/demodulators which are used to receive content.

Via the LAN, e.g., home, interface 504 the customer device 500 can exchange signals and/or information with other various customer premise equipments such as the gateway device 400 illustrated in FIG. 4. The LAN interface 504 supports the receipt and/or transmission of content, and/or other information over a local home network, e.g., MoCA based network, from/to the gateway device 400. For example in some embodiments alternative advertising content is received by the gateway device 400 over a communications over which the customer device 500 can not receive content, e.g., an IP based channel. In some such embodiments the alternative advertising content is supplied by the gateway device 400 to the customer device 500 over a home network via the home network interface 504 in accordance with the features of various embodiments of the invention. The LAN interface 504 includes a MoCA interface 520. The MoCA interface 520 serves as an interface to the LAN (e.g., home) network 121.

The codec 506 is a coder/decoder that can be and is used for encoding messages to be transmitted and decoding received messages which are encoded. The processor 508, e.g., a CPU, executes routines 522 and one or more modules and controls the device 500 to operate in accordance with the invention. The processor 508 is responsible for controlling the general operation of the customer device 500 including, e.g., presentation of information and/or content for display.

In addition to the routines 522, the memory 510 includes a user input detection module 524, a message processing module 526, a tuner control module 528, a commercial break detection module 530, a program content output control module 532, a communications module 534, a recording module 536, user information 538, device identification information 540, received alternative advertising content 542 and recorded content 546. The bus 509 allows the communication and exchange of information between and among the processor 508, the codec 506, the interfaces 502, 504 and the memory 510 which are coupled to the bus 509.

Routines 522 include communications routines and/or device control routines. User input detection module 524 detects a user input, e.g., input signals from a user received by the customer device 500. The input signals may be sent by a control device such as a remote control, or by other means, e.g., selecting an option by pressing a button on the device or icon on a touch screen etc. User input signals from a remote control are received via interface 502 in some embodiments. The user input detection module 524 determines, on receipt of an input, e.g., a control signal providing user input, what type of selection has been made by the user, e.g., a channel selection instructing to tune to a specific channel, recording selection for recording selected content, program guide selection, or another input.

The message processing module 526 is configured to process various messages and/or signals received by the STB 500, e.g., via the interfaces 502, 504. The received messages and/or signals include messages, instructions and/or other signals received from headend 102 and other devices, e.g., gateway device 400. In some embodiments the message processing module 526 processes a received message from the headend 102 indicating that alternative advertising content for an advertisement segment, e.g., corresponding to a commercial break, is available from an alternative content source and/or via a secondary communications channel different than a primary channel over which the user device 500 received programming content. In some embodiments the source for the alternative advertising content for the customer device 500 is the gateway device 400. In some embodiments the message from headend 102 indicates tuning parameters such as frequency corresponding to a secondary broadcast channel for obtaining the alternative advertising content. The STB 500 processes the received messages and provides information to the processor 508 and/or one or more other modules to take further action in response to the received messages in accordance with the invention.

The tuner control module 528 is configured to control the tuner/demodulator 512 to tune to a frequency corresponding to a program channel. This may be a user selected channel, e.g., for viewing or recording or, a channel to be tuned to when instructed by a server in the headend 102, e.g., to receive alternative advertising content. In various embodiments the tuning parameters, e.g., frequency corresponding to customer subscribed channels is provided by the headend 102, e.g., as content source information, which is stored by the STB 500. In the embodiments where alternative advertising content is provided via an independent broadcast channel, the tuning parameters for such a secondary channel are communicated separately to the STB 500.

The commercial break detection module 530 is configured to monitor to detect an indicator and/or identifier of an upcoming commercial break, e.g., by monitoring content stream communicating program content and advertising content received on the first channel, e.g., broadcast channel.

The program content output control module 532 is configured to control the presentation and playback of program content from the customer device 500 to the user, e.g., on a display device. In various embodiments the program content output control module 532 outputs content received on a first communications channels, e.g., a broadcast channel, to the user. In some embodiments the program content output control module 532 is further configured to output, during a commercial break which occurs on the first communications channels, alternative advertising content communicated via a second communications channel. In some embodiments the alternative advertising content is communicated via a unicast Internet Protocol (IP) packet stream over the second communications channel, e.g., to the gateway device 400, which then supplies the alternative advertising content over the local home network to the customer device 500 which receives it, e.g., via LAN interface 504. In various embodiments the content output control module 532 includes a switch control module 544 configured to control the content output control module 532 to switch from outputting content received on the first communications channel to outputting content communicated via the second communications channel during said commercial break, e.g., alternative advertising content 542. In various embodiments the second communications channel is different from the first communications channel, e.g., channel over which the STB 500 receives content stream including programming content and advertising content. In some embodiments at least some of the alternative advertising content 542 output during the commercial break is received during the commercial break.

The communications module 534 is configured communicate, e.g., via a transmitter in the interface 502, viewing information to a server or a device used to control transmission of alternative advertising content via the second communications channel. In some embodiments the communications module 534 is further configured send the viewing information to the device and/or or server, e.g., in the headend 102, after the commercial break detection module 530 detects the indicator of an upcoming commercial break (e.g., sending viewing information prior to or during the upcoming commercial break). In some embodiments the viewing information includes information identifying the program content being output by the customer device 500. In some embodiments the viewing information further includes information indicating the current position within the program content which is being output and/or being recorded by the customer device 500, e.g., an identifier of the particular upcoming commercial indicator that was detected and which corresponds to a particular portion of the program being output and/or recorded. Different commercial identifiers may have different identifier values which can indicate to the server where the commercial identifier is within the program and, in some embodiments, the duration of the commercial break.

In some embodiments the viewing information includes information that can be utilized by the service provider and/or a third party in targeting relevant advertising content to the customer premise device 500. In various embodiments such information includes information regarding the content being viewed by the customer, time of viewing, customer preferences and/or past viewing history and other related information.

In some embodiments the communications module 534 is further configured to transmit user information 540 from the customer device 500 to the device and/or server, the user information 538 including at least some user profile information. In some embodiments the communications module 534 is configured to communicate the viewing information and user profile information to the headend 102 via the gateway device 400. The information 538 in some embodiments includes user, e.g., subscriber, profile, and subscription information. The user profile in some embodiments indicates user's viewing habits, most watched programming content, most recorded programming content, age, income, gender, other attributes/characteristics etc.

The recording control module 536 controls the recording operations for the customer device 500. The recording control module 536 controls recording of user selected content requested for recording in accordance with the invention. In some embodiments the recording control module 536 controls the customer device 500 to implement the method of flowchart 300.

The device identification information 540 may include, e.g., Media Access Control (MAC) address of the customer device 500 or some other identifier identifying the device 500. The alternative advertising content 542 is the advertising content communicated over a secondary communications channel from a server and/or headend device. In some embodiments the server communicating the alternative advertising content s located external to the headend 102. The STB 500 in some embodiments receives the alternative advertising content 542 from the gateway device 400. The recorded content 546 is the content that has been recorded based on user request and is available for playback.

In some embodiments, one or more of the various modules discussed above work in coordination, e.g., with operations being merged to perform a function, to produce a desired output in accordance with the exemplary methods of the invention.

FIG. 6 illustrates an exemplary customer device 600, e.g., a set top box, of a second type implemented in accordance with one exemplary embodiment. In some embodiments the customer device 600 is configured to implement the method of flowcharts 200 and 300 in accordance with the invention. For the following discussion the customer device 600 of the second type will be referred to as STB 600. The STB 600 may be used in any one of the customer premises shown in FIG. 1, e.g., as the customer device-type 2 114. The STB 600 may be, and in some embodiments is, coupled to a display device, e.g. a monitor and/or a Television (TV). As discussed below in detail the STB 600 of the second type supports communications, e.g., with external devices located external to the customer premise, using standard QAM based communications channels as well as over IP. In some embodiments the STB 600 is a switched digital video capable STB device that supports receiving SDV programming content from an SDV server, e.g., SDV server 152.

The STB 600 includes a cable network interface 602, a local area, e.g., home, network interface 604, input device 605, a codec (Coder/Decoder) 606, a processor 608, and a memory 610 coupled together via a bus 609. The various elements of the customer device 600 can exchange data and information over the bus 609.

The cable network interface 602 includes at least one tuner/demodulator pair QAM tuner/demodulator 1 612, and a cable modem 615, e.g., a DOCSIS modem. In some but not all embodiments, a plurality of additional tuner/demodulator pairs are included as indicated by tuner/demodulator pair M 614 in the figure, which are coupled to the bus 609 via the bus I/O interface 611. Via the interface 602, the STB 600 can exchange signals and/or information with other devices and/or system elements such as the servers in the network headend 102, over the communications network 170. In some embodiments the customer device 600 receives content stream including programming content and advertising content communicated over a first communications channel. In some embodiments the first communications channel is, e.g., a broadcast channel or multicast digital channel. In some embodiments the interface 602 also includes, e.g., an infrared signal receiver to receive signals from a user remote control device. In some embodiments the multicast digital video channel is a switched digital video channel.

Thus the cable network interface 602 supports the receipt and/or transmission of content, and/or other information from/to different servers over the network 170. In various embodiments the cable network interface 602 also includes a transmitter to transmit content, e.g., over the communications network 170 in addition to the tuner/demodulators which are used to receive content. The QAM tuner-demodulator 612 is capable of tuning to a frequency band to receive content stream and demodulating the received content and/or information. The tuner/demodulators 612, 614 work under the control of processor 506 and the tuner control module 628. The cable modem 615 enables receiving content, e.g., advertising and/or programming content, via IP streams from the IP capable servers, e.g., servers 156, 160.

Via the LAN interface 604, e.g., home network interface, the STB 600 can exchange information with other customer premise equipments such as, e.g., the gateway device 400, collocated at a customer premise, via the local network, e.g., home network 121. Thus the LAN interface 604 supports the receipt and/or transmission of content, and/or other information over the home network from/to other custom premise equipments. In some embodiments the home network may be, e.g., Ethernet, WiFi, MoCA (Multimedia over Coax). The LAN interface 604 includes an Ethernet interface 616, an integrated WiFi modem 618 and a MoCA interface 620. In some embodiments the STB 600 receives the alternative advertising content over the local home network 121 via the LAN interface 604 (using one of the interfaces 616, 618, 620) from the gateway device 400.

The input device 605 may be a keypad, touch screen, and/or a microphone for receiving and processing voice input commands. The codec 606 is a coder/decoder that can be and is used for encoding messages to be transmitted and decoding received messages which are encoded. The processor 608, e.g., a CPU, executes routines 622 and one or more modules and controls the device 600 to operate in accordance with the invention. The processor 608 is responsible for controlling the general operation of the customer device 600 including, e.g., presentation of information and/or content for display. To control the customer device 600, the processor 606 uses information, various modules and/or routines including instructions stored in memory 610.

In addition to the routines 622, the memory 610 includes a user input detection module 624, a message processing module 626, a tuner control module 628, a commercial break detection module 630, a program content output control module 632, a communications module 634, a recording module 636, stored user information 638, device identification information 640, received alternative advertising content 642 and recorded content 646. The bus 609 allows the communication and exchange of information between and among the processor 608, the codec 606, the interfaces 602, 604 and the memory 610 which are coupled to the bus 609.

Routines 622 include communications routines and/or device control routines. User input detection module 624 detects a user input, e.g., input signals from a user received by the customer device 600. The input signals may be sent by a control device such as a remote control, or by other means, e.g., selecting an option by pressing a button on the device or icon on a touch screen etc. User input signals from a remote control are received via interface 602 in some embodiments.

Various other elements shown in the STB 600 perform same or similar functions as the like elements of STB 500 which have been discussed in detail above. For example modules 624, 626, 628, 630, 632, 634, 636 and 644 perform the same or similar functions as the modules 524, 526, 528, 530, 532, 534, 536 and 544 discussed with regard to FIG. 5. Thus to avoid repetition, the elements which are different or include different components therein such as, e.g., the cable network interface 602 and LAN interface 604, are discussed to highlight the differences.

The stored user information including user profile 638 in some embodiments includes user, e.g., subscriber, profile, and subscription information corresponding to the user of customer device 600. The user profile in some embodiments indicates user's viewing habits, most watched programming content, most recorded programming content, age, income, gender, etc. Device identification information 640 may include, e.g., Media Access Control (MAC) address of the device 600 or some other identifier identifying the device 600. The alternative advertising content 642 is the advertising content communicated over a secondary communications channel from a server and/or headend device. The STB 600 may receive the alternative advertising content 642 from a server or headend device and/or the gateway device 400. The recorded content 646 is the content that has been recorded based on user request and is available for playback. In some embodiments, one or more of the various modules discussed above work in coordination, e.g., with operations being merged to perform a function, to produce a desired output in accordance with the exemplary methods of the invention.

Figure 7:
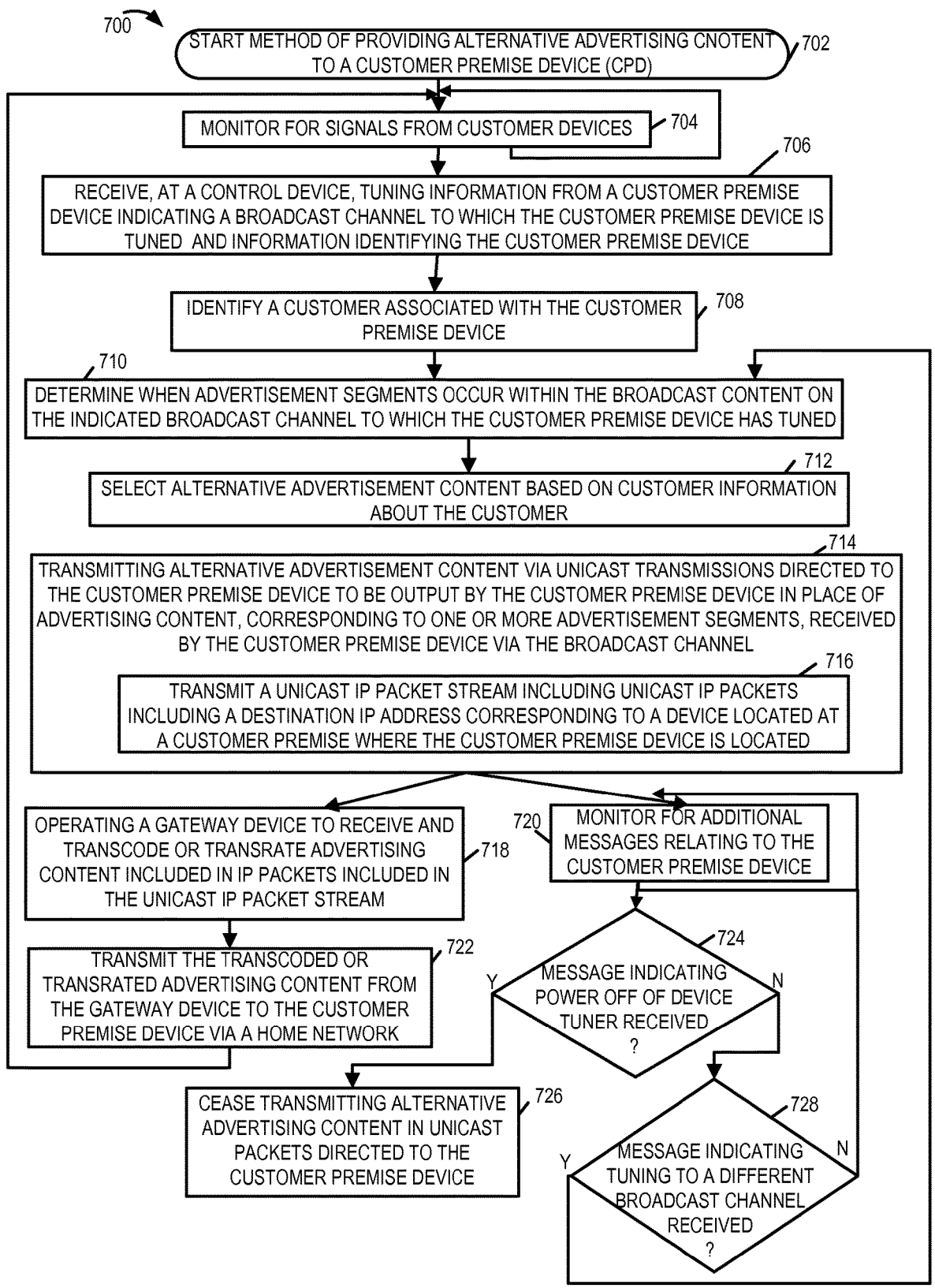
FIG. 7 is a flowchart illustrating the steps of an exemplary method of providing alternative advertising content via a secondary channel, in accordance with an exemplary embodiment.

FIG. 7 is a flowchart 700 illustrating the steps of an exemplary method of providing alternative advertising content via a secondary channel, in accordance with an exemplary embodiment implemented using the system shown in FIG. 1. In some embodiments at least some of the steps of the method 700 are performed by a control system, e.g., a control device such as the control server 160 or the VOD server 154 in the headend 102 shown in FIG. 1. The control server 160 may be an IP capable device but may also be or at least support, a non-IP signaling or message formats such as those commonly used in some cable systems. However in some embodiments the method of flowchart 700 is performed by a control system which may be implemented as one or more devices/servers that are located outside the headend 102. In some embodiments the control system is located in a distributed manner with some modules or elements of the control system located in the headend such as message receiving modules and customer databases and other elements or modules such as those which control or transmit alternative advertising content outside the headend. The headend 102 maybe, e.g., a network headend, hub site or other office where network components are located.

The method starts in step 702, e.g., with the control device being powered on. Operation proceeds to step 704. In step 704 which is performed on an ongoing basis the control device monitors for signals, e.g., messages, from customer devices, e.g., such as gateways devices and/or user set top boxes located at customer premises 104, 106. Such messages normally include one or more device identifiers such as IP and/or MAC addresses of the device which performed the reported tuning operation and/or a customer identifier along with information indicating the broadcast or SDV (Switched Digital Channel) to which the customer device has tuned. The time the tuning operation was performed may and also normally is indicated in the message. From the time the headend can determine the current program to which the customer premise device was tuned and/or the next program to be presented on the channel to which the customer premise device tuned. Operation proceeds from step 704 to step 706. In step 706, the control device receives a tuning message including tuning information from a customer premise device indicating a broadcast channel to which the customer premise device, e.g., STB, is tuned and information identifying the customer premise device. The tuning message is received in various embodiments via a gateway device located at a customer premise where the customer premise device is located. However, in other embodiments the tuning message is transmitted to the control device without traversing the gateway, e.g., using a cable network upstream communications channel or other upstream channel that may not traverse a gateway at the customer premise where the device doing the tuning is located.

Operation proceeds from step 706 to step 708. In step 708 a customer associated with the customer premise device is identified. The customer associated with the customer premise device may be, e.g., the subscriber of the services, e.g., the account holder. This may be done by performing a lookup operation based on a Set Top Box (STB) or other customer premise device identifier received in the tuning message. In some embodiments the control device includes customer premise device to customer mapping information, e.g., in a customer information database, that includes information associating a customer premise devices to subscribers and/or customers along with information such as customer name, address, age, location, income level, etc. that may be useful in targeting advertisements to be supplied to the customer device which performed the tuning operation reported in a received tuning message. In some embodiments the control device may request the information regarding a customer associated with a given customer premise device from the customer database 162. In some embodiments the control server also retrieves the customer's profile, e.g., stored in customer database 162, as part of step 708. Operation proceeds from step 708 to step 710. In step 710 the control device determines when advertisement segments occur within the broadcast content on the indicated broadcast channel to which the customer premise device has tuned. In some embodiments the information regarding the advertisement segments occurring within the broadcast content that is broadcast on a broadcast channel can be requested by the control device from the BFS 150 and the SDV content server 152. The control device may store this information and use it to determine the time and position of advertisement segments which occur within the broadcast content to which a customer device has tuned and also to select advertising content to provide to the customer premise device to be used as an alternative to broadcast advertising content communicated in the broadcast content stream in advertising segments. The time and length of the broadcast advertisement segments which occur in the content to which a device is tuned can be used by the control device in determining when it should unicast alternative advertising content directed to a device from which a tuning message was received. For example, alternative advertising content may be broadcast for each advertisement segment of a program with the content corresponding to an advertisement segment beginning to be transmitted slightly before or at the start of an advertisement segment with the some of the alternative content being transmitted in many cases during the time period of the advertising segment to which the alternative content corresponds. Thus, buffering or storage of alternative content can be minimized and a customer device can switch between outputting the broadcast advertisement and the unicast content by treating the unicast content as an alternative channel or content source with the customer premise device being able to switch between outputting the broadcast content and unicast alternative content in real time. Alternative advertising content in at least some embodiments will continue to be transmitted to a customer premise device for the duration of a broadcast program which is ongoing at the time a tuning message is received from the customer premise device and normally of the following broadcast program as well assuming a new tuning message or a power off message is not received from the customer premise device before the end of the program or subsequent broadcast program.

Operation proceeds from step 710 to step 712. In step 712 the control device selects alternative advertisement content based on customer information about the customer corresponding to the customer premise device. In some embodiments the selection of alternative advertisement content is further based on broadcast content being broadcast on the channel to which the customer premise device is tuned. In some embodiments the selection of alternative advertisement content is further based on a time of the day, month and/or year when the alternative advertisement content is being selected for supplying. In some embodiments the selection of alternative advertisement content is further based on the combination of one or more of the above discussed factors.

Operation proceeds from step 712 to step 714. In step 714 the control device transmits the alternative advertisement content via unicast transmissions directed to the customer premise device to be output by the customer premise device in place of advertising content, corresponding to one or more broadcast advertisement segments, received by the customer premise device via the broadcast channel. In some embodiments at least some alternative advertisement content to be output is transmitted during a broadcast advertisement segment in which the alternative advertisement content is to be displayed. Thus it should be appreciated that in some embodiments the transmission of alternative advertisement content via unicast IP transmission occurs in real time during the advertisement segments. In some embodiments the step of transmitting alternative advertisement content includes step 716 wherein the control device transmits a unicast IP packet stream including unicast packets including a destination IP address corresponding to a device located at a customer premise where the customer premise device is located. In some embodiments the device located at the customer premise is one of a gateway device or the customer premise device. For example in some embodiments the destination IP address corresponds to a gateway device such as gateway 124 located at customer premise 104 where customer premise devices, e.g., STB 110 and 114, are located. In some such embodiments the alternative advertising content is transmitted via the unicast IP packet stream to the gateway device. The gateway device processes the alternative advertisement content and provides it to the customer device for output as discussed below. The gateway device may, and in some embodiments does, use a MAC address or other device identifier included in the received unicast packets to identify the customer device to which the unicast alternative adverting content is directed. The gateway device may then transrate and/or transcode the content prior to communicating the alternative unicast content to the customer premise device over a home network which exists between the gateway and customer premise device in some embodiments.

Rather than rely on a gateway device to receive and forward content to the customer premise device to which a received tuning message corresponds, if the customer premise device supports unicast IP packet streams the device can receive and process the unicast advertising content stream directed to it without the need for a gateway device to receive and forward the uicast content stream to the customer premise device to which it is directed.

Operation proceeds from step 714 to steps 718 and 720 which are performed asynchronously. In step 718 the gateway device receives the alternative advertisement content included in the unicast IP packets included in said unicast IP packet stream from the control device. The gateway device is operated to transcode or transrate the received alternative advertising content. Operation proceeds to step 722. In step 722 the gateway device transmits the transcoded or transrated advertising content to the customer premise device, e.g., STB, via a home network such as home network 120. In accordance with the features of the invention the customer premise device outputs the alternative advertising content in place of the advertising content during one or more advertising segments within the broadcast content being output on the broadcast channel to which the customer device is tuned to. Operation continues in this manner as indicated by the loop back from step 722 back to 704.

Returning to step 720. Step 720 in some embodiments is performed following the transmission of the alternative advertising content from the control device as discussed in steps 714 and 716. In step 720 which is performed on an ongoing basis the control device monitors for additional signals/messages relating to the customer premise device. Operation proceeds to step 724. In step 724 it is determined if a message indicating power off of a tuner of the customer premise device is received. In some embodiments such a power off indication message is sent when the user turns off the customer premise device. The power off indication message in some embodiments is communicated by customer device via the gateway device. For example when the gateway device located at the customer premise detects that customer premise device, e.g., STB, is turned off and/or detects a period of inactivity beyond some threshold time period, the gateway device may send the power off indication message to the control device. In some other embodiments the power off indication message is communicated directly by the customer premise device to a device/server in the headend 102. If it is determined that such a power off indication message is received, the operation proceeds to step 726. In step 726 the control device ceases to transmit alternative advertising content in unicast IP packets directed to the customer premise device, e.g., in response to receiving a signal indicating that the customer premise device has powered off its tuner.

If in step 724 it is determined that the tuner power off indication message is not received, the operation proceeds from step 724 to step 728. In step 728 it is determined if a message indicating a customer device's tuning to a different broadcast channel is received, e.g., indicating that the customer premise device is tuned to a different broadcast channel. If it is determined that the customer premise device has tuned to a different broadcast channel the operation proceeds from step 728 to step 710 and the operation continues with various steps 710 through 728 being repeated. If it is determined that the customer premise device has not tuned to a different broadcast channel the operation proceeds from step 728 back to the monitoring step 720. Thus it should be appreciated that in various embodiments the control device transmits alternative advertisement content via unicast IP packets for the advertisement segments of a program being broadcast at the time the tuning message (such as the one discussed in step 706) is received absent receipt of a message indicating tuning to a different broadcast channel or powering off of a tuner of said customer premise device.

As should be appreciated the number of unicast IP content streams providing alternative content to individual devices tuned to a broadcast channel may become quite large and may involve use of significant communications resources. To minimize upstream signaling overhead which can be important with older devices which do not support large upstream communications channels, while still trying to maintain efficient use of resources which are available for communicated targeted advertisement content to individual customer premise devices, in some embodiments the control device will continue to cause targeted advertisements to be sent to a customer premise device for a predetermined period of time after receiving a tuning message from the customer premise device absent receipt of another tuning message or a power off message. In some embodiments the predetermined period of time is the time, i.e., broadcast time period, of a program on the channel to which the device has tuned at the time indicated in the received tuning message. In other embodiments the predetermined time corresponds to the duration of the current broadcast program and subsequent broadcast program on the channel to which the customer tuned. Thus, at the end of a program alternative advertisement content may, and in some embodiments is, automatically stopped without the need for the receipt of a signal from the customer premise device. Such an approach provides a reasonable tradeoff, in some embodiments, between the number of upstream signals and the amount of downstream bandwidth which may be wasted if the control device in the headend fails to promptly detect that a device is no longer tuned to a broadcast channel or has become inactive.

Figure 8:
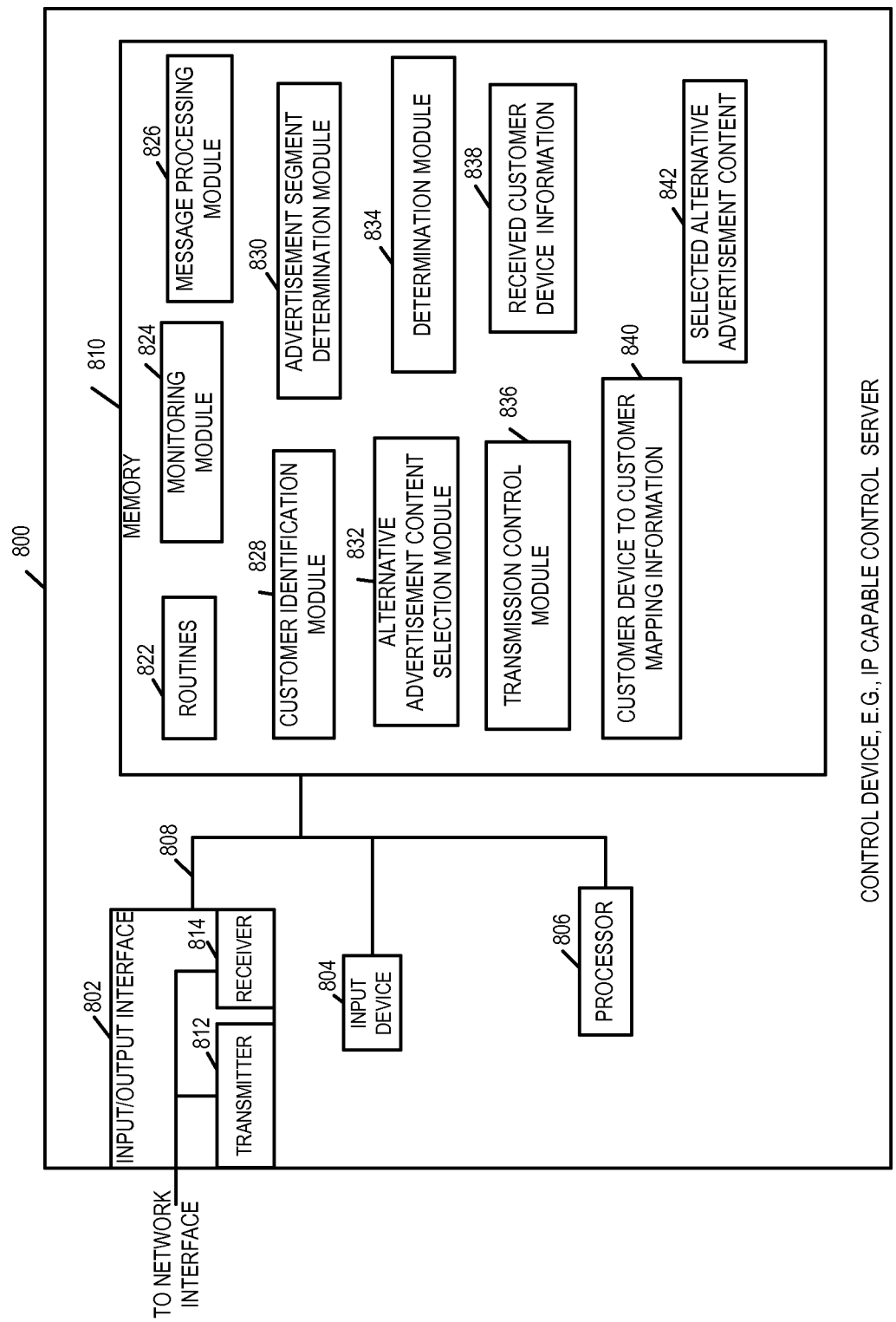
FIG. 8 illustrates an exemplary control device implemented in accordance with an exemplary embodiment.

FIG. 8 illustrates an exemplary control device 800 implemented in accordance with an exemplary embodiment. The exemplary control device 800 can be, and in some embodiments is, used as the IP capable control server 160 and/or the IP capable VOD server 154 shown in FIG. 1. In some embodiments the control device 800 is configured to implement at least some of the steps of the method of flowchart 700. In accordance with one aspect of some embodiments the exemplary control device 800 transmits alternative advertising content via unicast IP packets communicated via a second communications channel, directed to the customer premise device, e.g., STB, at a customer premise. In accordance with the features of some embodiments a gateway device located at the customer premise receives and processes the received unicast IP packet stream communicating the alternative advertising content and supplies it to the the customer devices, e.g., STB.

As shown, the control device 800 includes an input/output (I/O) interface 802, an input device 804, a processor 806, and a memory 910 coupled together via a bus 808. The various elements of the control device 800 can exchange data and information over the bus 808.

The I/O interface 802 includes a transmitter 812 and a receiver 814. In some embodiments via the I/O interface 802 the control device 800 is coupled to the network interface 168 of the headend 102 via which alternative advertising content and other information is communicated over communications network 170 to the devices located at the customer premises. Furthermore via the I/O interface 802, the control device 800 can exchange signals and/or information with other devices and/or system elements such as the servers in the network headend 102 over the local network 166 of system 100. The control device 800 is configured to receive, e.g., via the receiver 814 of interface 802, a tuning message including tuning information indicating a broadcast channel to which a customer premise device is tuned and information identifying the customer premise device. In some embodiments the control device 800 is further configured to receive, e.g., via the receiver 814 of interface 802, a power off indication signal indicating that a customer premise device has powered off its tuner. It should be appreciated that while the tuning message with tuning information and the power off indication message originates from the customer premise device, in various embodiments the control device 800 receives such messages via the gateway device or another device/server.

The input device 804 may be a keypad, touch screen, and/or other device for receiving and processing input commands/instructions. The processor 806, e.g., a CPU, executes control routines 822 and one or more modules to control the control device 800 to operate in accordance with the invention and implement one or more steps of the method of flowchart 700. Thus to control the operation of control device 800, the processor 806 uses information, various modules and/or routines including instructions stored in memory 810.

In addition to the routines 822, the memory 810 includes a monitoring module 824, a message processing module 826, a customer identification module 828, advertisement segments determination 830, an alternative advertisement selection module 832, a determination module 834, a transmission control module 836, received customer premise device information 838, customer device to customer mapping information 840, and selected alternative advertisement content 842. Routines 822 include communications routines and/or device control routines.

The monitoring module 826 is configured to monitor for messages and/or signals from other devices, e.g., customer premise devices. The message processing module 826 is configured to process various messages and/or signals received by the control device 800, e.g., via the interface 802, e.g., such as the tuning message discussed in step 706 of flowchart 706. In various embodiments the processing module is further configured to processes power off indication message and the tuning message discussed above with regard to flowchart 700. Thus the message processing module 826 is configured to process the received messages and/or signals and provide information to the processor 806 and/or one or more other modules to take further action in response to the received messages.

The customer identification module 828 is configured to identify a customer associated with the customer premise device which is tuned to the broadcast channel. In some embodiments the customer identification module 828 uses the customer device to customer mapping information 840 stored in the control device 800 to identify the customer that is associated with the customer premise device from which the tuning information is received. In some embodiments the control device 800 may seek customer information from the customer database 162 in order to identify the customer associated with the customer premise device.

The advertisement segment determination module 830 is configured to determine when advertisement segments occur within the broadcast content on the broadcast channel (indicated by the received tuning information) to which the customer premise device is tuned. In some embodiments the advertisement segment determination module 830 detects indicators and/or identifiers of upcoming commercial break segments within the broadcast content on the broadcast channel to determine when the advertisement segments occur. The alternative advertisement content selection module 832 is configured to select alternative advertisement content based on customer information about the customer corresponding to the customer premise device. In some embodiments the selection module 832 performs the selection of alternative advertisement content further based on broadcast content being broadcast on the channel to which the customer premise device is tuned. In some embodiments the selection of alternative advertisement content is further based on a time of the day, month and/or year when the alternative advertisement content is being selected for supplying. In some embodiments the selection of alternative advertisement content is further based on the combination of one or more of the above discussed factors.

The determination module 834 is configured to determine if a power off indication message indicating power off of a tuner of the customer premise device is received by the control device 800. The power off indication message in some embodiments is received via the gateway device. The determination module 834 is further configured to determine if a message indicating a customer device's tuning to a different broadcast channel is received, e.g., indicating that the customer premise device is tuned to a different broadcast channel that the earlier received tuning message.

The transmission control module 836 in some embodiments is configured to send a message to the gateway device indicating that alternative advertising content for one or more advertisement segments is available for delivery via a secondary communications channel different than a broadcast channel to which the customer premuise device, e.g., STB, is tuned. In various embodiments the transmission control module 836 controls the transmitter 812 to transmit alternative advertisement content via unicast transmissions directed to the customer premise device to be output by the customer premise device in place of advertising content, corresponding to one or more broadcast advertisement segments, received by the customer premise device via the broadcast channel. In some embodiments at least some alternative advertisement content to be output is transmitted during a broadcast advertisement segment in which the alternative advertisement content is to be displayed. In some embodiments the transmission control module 836 controls the transmitter 812 to transmit a unicast IP packet stream including unicast IP packets including a destination IP address corresponding to a device located at a customer premise where the customer premise device is located. In some embodiments the device located at the customer premise is the gateway device. The gateway device processes the alternative advertisement content and provides it to the customer premise device, e.g., STB, for output.

In various embodiments the determination module 834 is configured to provide the results of determination to the transmission control module 836, e.g., to control advertisement transmission related functions. In some embodiments when the determination module 834 determines that a power off indication message is received it provides this information to the transmission control module 836 and the transmission control module 836 controls the transmitter 812 to cease transmitting alternative advertising content in unicast IP packets directed to the customer premise device. In some embodiments when it is determined that the customer premise device has tuned to a different broadcast channel, the transmission control module 836 stops transmitting the alternative advertisement content that was selected for replacing advertising content in the advertisement segments which occur on the other broadcast channel to which the customer device was tuned to earlier.

Received customer device information 838 includes the identification and/or capability information corresponding to the customer premise device received from the customer premise device, e.g., via the gateway or from another device/server. The selected alternative advertisement content 842 includes packetized alternative advertisement content selected by the selection module 832 in accordance with the invention, which has been packetized for transmission.

It should be appreciated that the methods and apparatus allow an advertiser to be informed of customer device tuning and thus viewing information in real time while allowing an advertiser to act on such information and supply highly targeted alternative advertising content via a unicast content delivery stream for customers of interest to the advertiser without having to send alternative advertising content to other customers in the local vicinity or even build as the targeted customer or targeted customer premise device, e.g., set top box.

In some embodiments various modules in the devices 400, 500, 600, 800 are implemented fully in hardware, e.g., as individual circuits, within a processor of the corresponding device 400, 500, 600, 800. In other embodiments some of the modules are implemented, e.g., as circuits, within the device processor (e.g., processor 406, or 508, or 608 or 806) with other modules being implemented, e.g., as circuits, external to and coupled to the processor. Alternatively, in some other embodiments rather than being implemented as circuits, all or some of the modules may be implemented in software and stored in the memory of the devices 400, 500, 600, 800 with the modules controlling operation of the corresponding device to implement the functions corresponding to the modules when the modules are executed by a processor, e.g., such as processor 508 of customer device 500.

In still other embodiments, various modules are implemented as a combination of hardware and software, e.g., with a circuit external to the processor providing input to the processor which then under software control operates to perform a portion of a module's function.

While each device in FIGS. 4, 5, 6 and 8 respectively is shown to include a single processor, e.g., computer, within the device, it should be appreciated that the processor may be implemented as one or more processors, e.g., computers. When implemented in software, the modules include code, which when executed by the processor of the corresponding device, configure the processor, e.g., computer, to implement the function corresponding to the module. In some embodiments, the processor included in the corresponding device is configured to implement each of the modules.

One particular embodiment is directed to a system for providing advertising content to a playback device, comprising an interface including a receiver configured to receive a tuning message including tuning information from a customer premise device indicating a broadcast channel to which the customer premise device is tuned and information identifying the customer premise device; an advertisement segment determination module configured to determine when advertisement segments occur within the broadcast content on the indicated broadcast channel to which the customer premise device has tuned; and a transmitter, included in said interface, configured to transmit alternative advertisement content via unicast transmissions directed to said customer premise device to be output by said customer premise device in place of advertising content, corresponding to one or more broadcast advertisement segments, received by said customer premise device via said broadcast channel. The particular exemplary system further includes, in some embodiments, a customer identification module configured to identify a customer associated with said customer premise device; and a selection module configured to select said alternative advertisement content based on customer information about said customer which is used for advertisement targeting purposes.

Completely hardware based or completely software based modules may be used. However, it should be appreciated that any combination of software and hardware (e.g., circuit implemented) modules may be used to implement the functions. As should be appreciated, the modules included in the devices illustrated in FIGS. 5 and 6 control and/or configure the corresponding devices 500 and 600 respectively or elements therein such as the corresponding processor to perform the functions of the steps illustrated and/or described in the method of flowcharts 200 and 300. Similarly the modules included the device illustrated in FIG. 8 control and/or configure the corresponding device 800 or elements therein such as the corresponding processor to perform the functions of one or more steps illustrated and/or described in the method of flowchart 700.

In some embodiments a detection regarding a commercial break can be made in various manners, for example, in some embodiments a customer device receiving the content stream including a program and advertising content uses digital advertisement insertion tones/signals that exist in the content steam to determine where the commercial break (e.g., advertisement) starts and ends. In some embodiments the content stream includes upcoming commercial break indicators. These are just some examples to facilitate understanding of some of the many various embodiments supported by the methods and apparatus of the invention and are not intended to be limiting in nature.

Various embodiments have been discussed above. It should be appreciated that the invention is not intended to be limited by the exemplary embodiments which are to facilitate an understanding of the invention and its many possible applications.

In various embodiments system elements described herein are implemented using one or more modules which are used to perform the steps corresponding to one or more methods of the present invention, for example, receiving content, e.g., including program content and advertisements, via a first channel, outputting content received via the first channel to a display device etc. In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method, the method comprising:
communicating, from a customer premise device to a control device, used to control the supply of alternative content to the customer premise device, a tuning message including tuning information sent from the customer premise device, said tuning message including an identifier identifying the customer premise device and indicating: i) a first communications channel, said first communications channel being a broadcast channel to which the customer premise device has tuned and ii) a time at which the customer premise device tuned to the first communications channel;

receiving, at said customer premise device, user selected program content on the first communications channel;

outputting, from the customer premise device, said user selected program content received on the first communications channel;

monitoring, at said customer premise device, said user selected program content received on said first communications channel to detect an indicator indicating an upcoming commercial break;

receiving, at the customer premise device, alternative advertisement content transmitted by the control device via unicast IP packets, sent over a second communications channel which is different from said first communications channel, said unicast IP packets including alternative advertisement content to be used for a program being broadcast at the time the tuning message is received by the control device;

determining if user selected program content being received on the first communications channel is being recorded; and when it is determined that user selected content being received on the first communications channel is being recorded, recording alternative advertising content received via the second communications channel along with the user selected program content;

recording advertising content received via the first communications channel in addition to the alternative advertising content received via the second communications channel and the user selected program content; and outputting, during a commercial break which occurs on said first communications channel, alternative advertising content communicated via said second communications channel, said alternative advertising content being different from said user selected program content received on the first communications channel.

2. The method of claim 1, further comprising:
operating a gateway device, located at a customer premise where the customer premise device is located, to send a power off indication message to the control device in response to detecting that the customer premise device is turned off or in response to detecting a period of inactivity beyond a threshold time period.

3. The method of claim 1, further comprising:
communicating, from the customer premise device, viewing information to said control device after detecting an indicator of an upcoming commercial break and prior to the commercial break.

4. The method of claim 3, wherein monitoring said user selected program content received on said first communications channel to detect an indicator of an upcoming commercial break includes monitoring for indicators indicating the start and the end or duration of the upcoming commercial break.

5. The method of claim 1, wherein said tuning message further includes information indicating a current position within said user selected program content which is being output.

6. The method of claim 5, further comprising:
transmitting user information from said customer premise device to said control device, said user information including at least some user profile information.

7. The method of claim 1, wherein said control device is a video on demand server; and
wherein the method further comprises:
switching, during said commercial break, said customer premise device from outputting content received on said first communications channel to outputting content communicated via said second communications channel.

8. The method of claim 7, further comprising:
operating the control device to cause targeted advertisements to be sent to the customer premise device for a predetermined period of time after receiving the tuning message, said predetermined period of time being a broadcast time period of a program on the first communications channel at the time indicated in said tuning message.

9. A customer premise device, comprising:
a receiver configured to receive: i) user selected program content on a first communications channel, and ii) alternative advertisement content transmitted by a control device via unicast IP packets, sent over a second communications channel which is different from said first communications channel, said unicast IP packets including alternative advertisement content to be used for a program being broadcast at the time a tuning message is received by the control device;

an output control circuit configured to output user selected program content received on a first communications channel, said first communications channel being a broadcast channel;

a processor configured to control the customer premise device to:
monitor said user selected program content received on the first communications channel to detect an indicator indicating an upcoming commercial break; and
determine if user selected program content being received on the first communications channel is being recorded; and
when it is determined that user selected program content being received on the first communications channel is being recorded, record alternative advertising content received via the second communications channel along with the user selected programming content;
record advertising content received via the first communications channel in addition to the alternative advertising content received via the second communication channel and the user selected program content; and a communications circuit configured to communicate to said control device, used to control the supply of alternative content to the customer premise device, a tuning message including tuning information sent from the customer premise device, said tuning message including an identifier identifying the customer premise device and indicating: i) said first communications channel, said first communications channel being a broadcast channel to which the customer premise device has tuned and ii) a time at which the customer premise device tuned to the first communications channel; and wherein said output control circuit is further configured to output, during a commercial break which occurs on said first communications channel, alternative advertising content communicated via said second communications channel, said alternative advertising content being different from said user selected program content received on the first communications channel.

10. The customer premise device of claim 9, wherein said alternative advertising content is communicated via a unicast Internet Protocol (IP) packet stream over said second communications channel.

11. The customer premise device of claim 10,
wherein said communications circuit is configured to communicate:
a power off message to the control device indicating when the customer premise device is being powered off.

12. The customer premise device of claim 11, wherein said processor is configured to control the customer premise device to monitor for indicators indicating the start and the end or duration of the upcoming commercial break, as part of being configured to control the customer premise device to monitor the user selected program content received on said first communications channel to detect an indicator of an upcoming commercial break.

13. The customer premise device of claim 9, wherein said tuning message includes information identifying the program content being output by said customer premise device.

14. The customer premise device of claim 13, wherein said tuning message further includes viewing information indicating a current position within said user selected program content which is being output.

\* \* \* \* \*